USO12005618B2

(12) United States Patent
Fazziani et al.

(10) Patent No.: US 12,005,618 B2
(45) Date of Patent: Jun. 11, 2024

(54) LINE AND METHOD FOR THE CONTINUOUS CYCLE PRODUCTION OF PLASTIC OBJECTS

(71) Applicant: SACMI COOPERATIVA MECCANICI IMOLA SOCIETA' COOPERATIVA, Imola (IT)

(72) Inventors: Matteo Fazziani, Imola (IT); Davide Baldisserri, Imola (IT); Carlo Ceroni, Imola (IT); Stefano Bergami, Castel San Pietro Terme (IT)

(73) Assignee: SACMI COOPERATIVA MECCANICI IMOLA SOCIETA' COOPERATIVA, Imola (IT)

( * ) Notice: Subject to any disclaimer, the term of this patent is extended or adjusted under 35 U.S.C. 154(b) by 57 days.

(21) Appl. No.: 17/049,234

(22) PCT Filed: Apr. 17, 2019

(86) PCT No.: PCT/IB2019/053168
§ 371 (c)(1),
(2) Date: Oct. 20, 2020

(87) PCT Pub. No.: WO2019/207420
PCT Pub. Date: Oct. 31, 2019

(65) Prior Publication Data
US 2021/0237320 A1 Aug. 5, 2021

(30) Foreign Application Priority Data
Apr. 24, 2018 (IT) .................. 102018000004832

(51) Int. Cl.
B29C 43/58 (2006.01)
B29C 43/08 (2006.01)
G05B 19/042 (2006.01)

(52) U.S. Cl.
CPC .............. B29C 43/58 (2013.01); B29C 43/08 (2013.01); B29C 2043/5808 (2013.01);
(Continued)

(58) Field of Classification Search
CPC .......... G05B 19/042; G05B 2219/1161; B29C 43/08; B29C 2043/5833; B29C 2043/5875
See application file for complete search history.

(56) References Cited

U.S. PATENT DOCUMENTS 3,002,229 A * 10/1961 Friederich ............... B29C 45/47
264/328.17
6,354,674 B1 * 3/2002 Iwamoto ............. F15B 13/0832
303/119.3
(Continued)

FOREIGN PATENT DOCUMENTS

CN 105563787 B 3/2018
CN 105881802 B 5/2018
(Continued)

OTHER PUBLICATIONS

Office Action issued in Japanese Patent Application No. 2020-559480 dated Jan. 4, 2022 with English Translation.
(Continued)

Primary Examiner — Alison L Hindenlang
Assistant Examiner — Debjani Roy
(74) Attorney, Agent, or Firm — United IP Counselors, LLC

(57) ABSTRACT

A line for the continuous cycle production of plastic objects comprises: an extruder configured to deliver a flow of plastic fluid; a compression moulding machine including a rotating moulding carousel and a plurality of moulds to form an ordered succession of objects from corresponding doses; a transfer apparatus configured to feed the doses individually
(Continued)

to the compression moulding machine; a conveyor; a first sensor configured to detect a first diagnostic signal; a control unit programmed to capture the first diagnostic signal.

14 Claims, 8 Drawing Sheets

(52) U.S. Cl.
CPC ...... *B29C 2043/5816* (2013.01); *B29C 2043/585* (2013.01); *B29C 2043/5891* (2013.01); *G05B 19/042* (2013.01); *G05B 2219/1161* (2013.01)

(56) References Cited

U.S. PATENT DOCUMENTS

| | | | | |
|---|---|---|---|---|
| 8,794,955 | B2* | 8/2014 | Aldigeri | B29C 43/50 425/348 R |
| 9,463,933 | B2* | 10/2016 | Diebold | B65G 23/00 |
| 2005/0104263 | A1* | 5/2005 | Larsen | B29C 43/08 264/542 |
| 2008/0042325 | A1* | 2/2008 | Imatani | B29C 49/64 264/454 |
| 2008/0268274 | A1* | 10/2008 | Parrinello | B29C 31/048 425/112 |
| 2016/0175915 | A1 | 6/2016 | Albonetti et al. | |
| 2017/0351235 | A1* | 12/2017 | Edelen | G05B 19/042 |

FOREIGN PATENT DOCUMENTS

| | | |
|---|---|---|
| JP | 2012206339 A | 10/2012 |
| WO | 0132390 A1 | 5/2001 |
| WO | 2004096515 A1 | 11/2004 |
| WO | 2007017418 A2 | 2/2007 |
| WO | 2011010293 A2 | 1/2011 |
| WO | 2016181361 A1 | 11/2016 |
| WO | 2018051240 A1 | 3/2018 |

OTHER PUBLICATIONS

International Search Report issued in International Patent Application No. PCT/IB2019/053168 dated Jul. 29, 2019.

Rohe, T., et al., "Near infrared (NIR) spectroscopy for in-line monitoring of polymer extrusion processes", Talanta 50, 1999, pp. 283-290.

Written Opinion issued in International Patent Application No. PCT/IB2019/053168 dated Jul. 27, 2019.

* cited by examiner

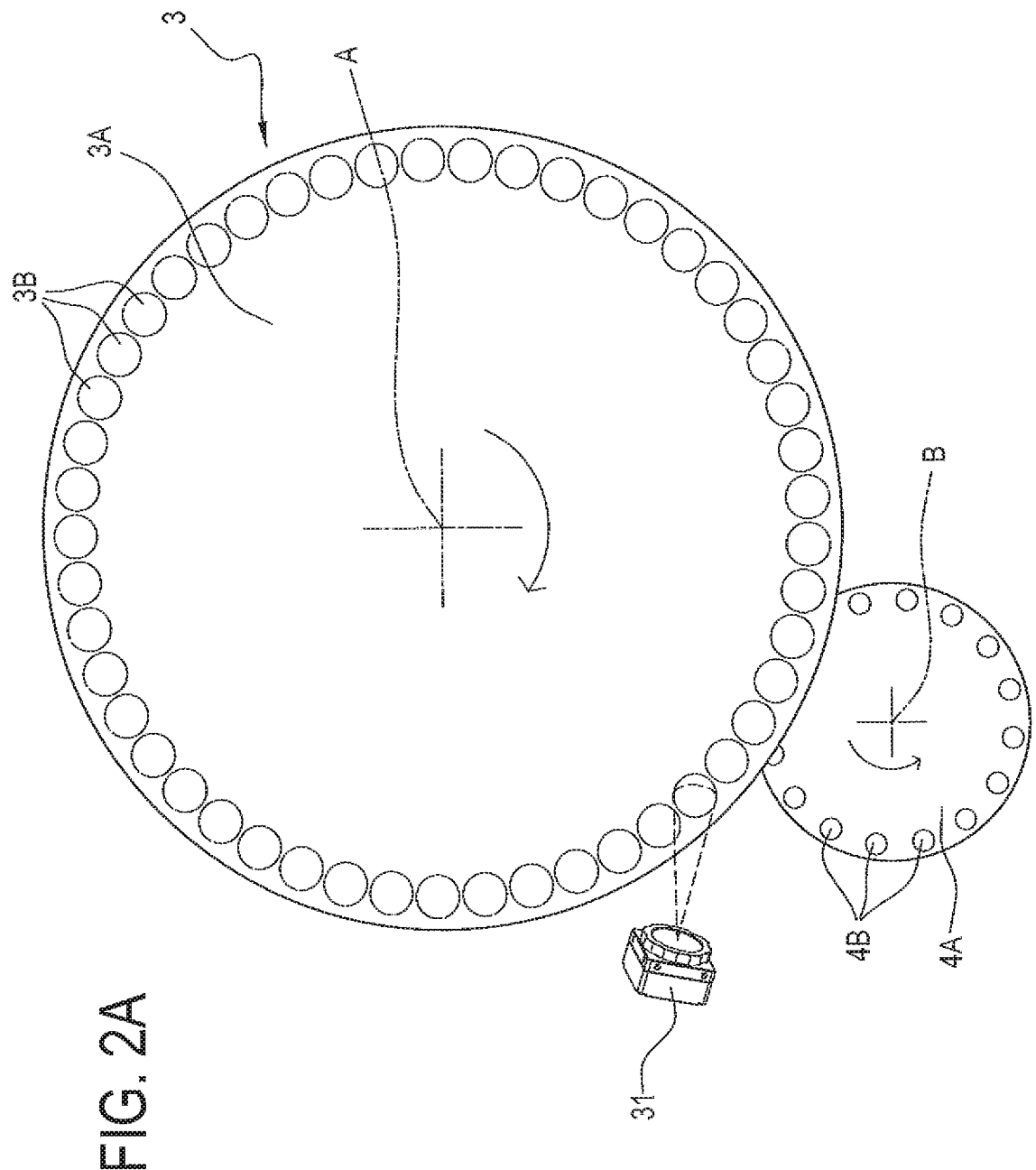

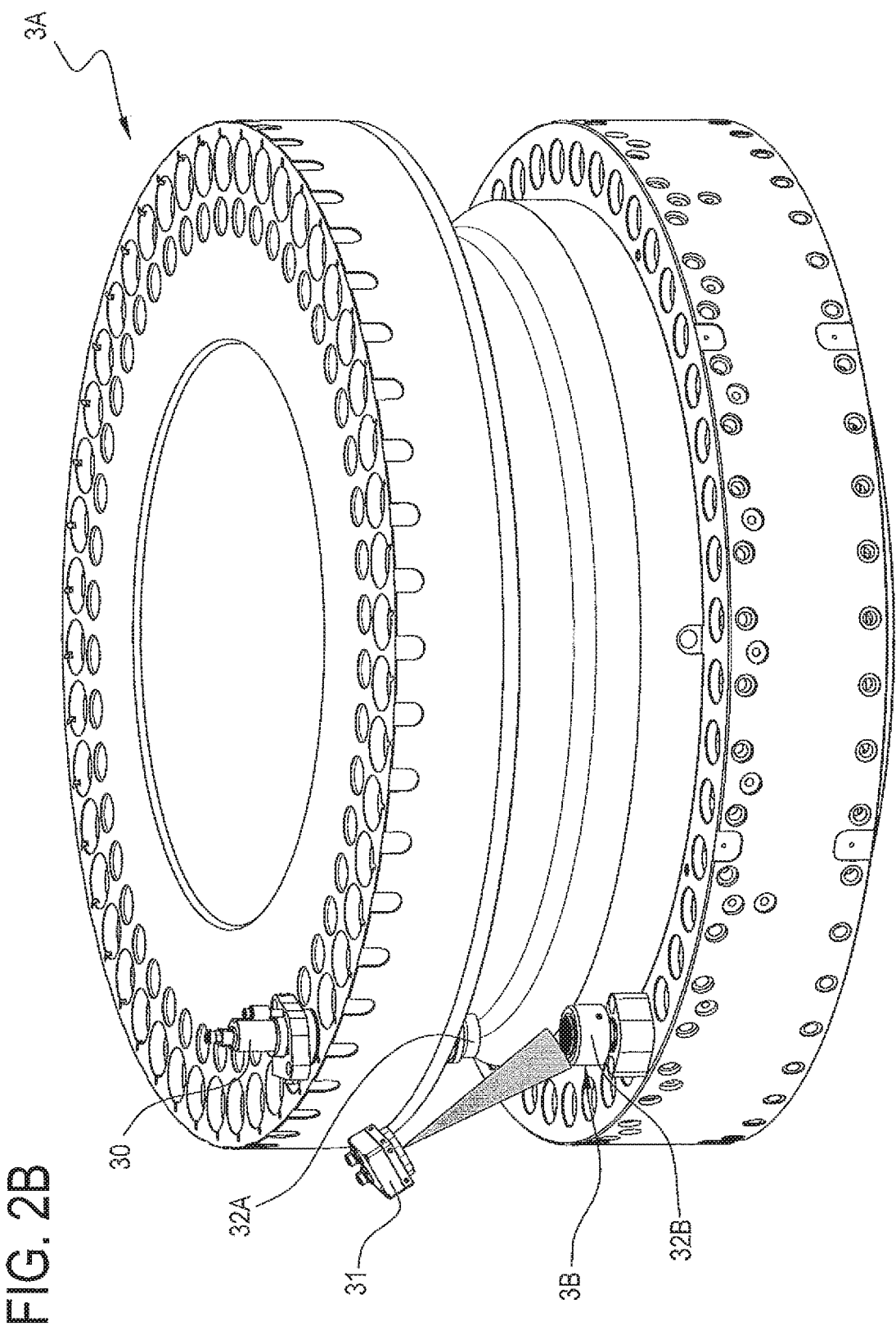

LINE AND METHOD FOR THE CONTINUOUS CYCLE PRODUCTION OF PLASTIC OBJECTS

TECHNICAL FIELD

This invention relates to a line and a method for the continuous cycle production of plastic objects.

BACKGROUND ART

In the field of the production of plastic objects, such as capsules, caps and parisons, production lines for the continuous cycle production of plastic objects are known. These lines comprise compression moulding machines which include a rotating moulding carousel and a plurality of moulding units which are angularly equispaced on the moulding carousel. Examples of machines of this type are described in patent documents WO0132390A1, WO2007017418A2 and WO2018051240A1. These lines also comprise transfer devices such as, for example, those described in patent documents WO2004096515A1, WO2011010293A2, configured to feed doses of plastic material to the moulding machines and to withdraw the moulded objects from the machines. These lines may also comprise extruders configured to deliver a fluid material from which the doses are obtained; an example of an extruder is described in patent document WO2016181361A1.

Lines such as these suffer from several drawbacks. First of all, the feed device is subject to the progressive wear of its mechanical components; such wear is particularly critical where the components are pneumatically driven. Errors positioning the doses on the moulding carousel are also possible. Further, the mechanical components of the moulding units disposed on the moulding carousel, tend to wear down to such an extent as to create critical problems in the circuit which drives these components. Malfunctions in the cooling units responsible for cooling the moulded objects on the moulding carousel may also arise. Problems may also arise in the system for extracting the moulded objects from the moulding carousel.

These (and other) problems may lead to the production of defective products and/or sudden machine breakdowns. Thus, in the prior art production lines, the general issue is that of being able to identify with a good degree of precision and reliability any problems in the moulded objects, so as to enable specific corrective actions to be taken. Another issue concerns prompt identification of wear and malfunctions in the machines so that action can be taken before such wear and malfunctions result in defective moulded products or machine breakdowns.

DISCLOSURE OF THE INVENTION

This disclosure has for an aim to provide a line for the continuous cycle production of plastic objects to overcome the above mentioned disadvantages of the prior art. Another aim of this disclosure is to provide a method for the continuous cycle production of plastic objects to overcome the above mentioned disadvantages of the prior art.

These aims are fully achieved by the line and method of this disclosure as characterized in the appended claims.

More specifically, this disclosure relates to a line for the continuous cycle production of plastic objects. The plastic objects may be, for example, capsules, caps or parisons.

In one embodiment, the line may comprise an extruder. The extruder is configured to receive solid material in raw form. The solid material is preferably plastic material. The extruder is configured to feed out a flow of plastic fluid.

In one embodiment, the line may comprise a moulding machine. The moulding machine is preferably a compression moulding machine. In one embodiment, the moulding machine is an injection moulding machine. In one embodiment, the moulding machine is an injection compression moulding machine.

The moulding machine includes a rotating moulding carousel. The moulding machine includes a plurality of moulds. The moulds of the plurality are preferably equispaced along the moulding carousel. The moulds of the plurality are preferably disposed along a circular peripheral zone of the moulding carousel. The moulding machine is configured to mould an ordered succession of objects from corresponding doses.

In one embodiment, the line may include a transfer apparatus. The transfer apparatus is configured to obtain an ordered succession of doses from the flow of plastic material (feeding out of the extruder). The transfer apparatus is configured to receive an ordered succession of doses from the flow of plastic material (feeding out of the extruder). The transfer apparatus is configured to process an ordered succession of doses from the flow of plastic material (feeding out of the extruder). The transfer apparatus is configured to feed the doses individually (that is, one by one) to the compression moulding machine. In one embodiment, the transfer apparatus includes a transfer carousel. In one embodiment, the transfer apparatus includes a transfer belt.

In one embodiment, the line may include a conveyor. The conveyor is configured to receive the (moulded) objects individually and to move them. In moving the objects, the conveyor is configured to maintain the ordered succession.

In one embodiment, the transfer apparatus, the compression moulding machine and the conveyor are configured to process an ordered sequence of doses or objects. Thus, a given ordered sequence of doses obtained (or received) by the transfer apparatus will generate a sequence of objects ordered according to the same sequence as that ordered sequence.

In one embodiment, the transfer apparatus, the compression moulding machine and the conveyor are in step with each other. That means that for each dose fed to the compression moulding machine by the transfer apparatus, the compression moulding machine transfers an object to the conveyor (thus freeing a mould, which will be occupied by the dose fed in). In one embodiment, the line comprises one or more buffer units organized according to first in first out (FIFO) logic. That way, even if the transfer apparatus, the compression moulding machine and the conveyor are not in step with each other, the ordered sequence is maintained.

In one embodiment, the transfer apparatus is configured to receive moulded objects from the moulding carousel (in succession).

In one embodiment, the transfer apparatus is configured to transfer the moulded objects to the conveyor.

In one embodiment, the transfer carousel is configured to receive the moulded objects from the moulding carousel and to transfer the moulded objects to the conveyor.

In one embodiment, the transfer apparatus includes a first transfer carousel and a second transfer carousel. The first transfer carousel is configured to receive the moulded objects from the moulding carousel. The first transfer carousel is, in one embodiment, configured to transfer the objects to the second transfer carousel. The second transfer carousel is in turn configured to receive the objects from the first transfer carousel and to transfer them to the conveyor.

The line includes a first sensor. The first sensor is configured to detect a first diagnostic signal. The first sensor is disposed at a first predetermined position in the line.

In one embodiment, the line may include a control unit. The individual parts (units) of the line, such as the extruder and the moulding machine, for example, might also be equipped with respective (local) control units. In a possible embodiment, the line control unit is connected to the (local) control units of the individual units. The following description of the control unit refers, for convenience, to the line control unit but it is understood that it also applies to (that is, may refer to) the local control units of the individual units (or groups of units).

The control unit is configured to generate a synchronization signal. The synchronization signal represents an operating configuration of the line in real time. The control unit is programmed to capture the first diagnostic signal synchronously relative to the synchronization signal.

By capturing the first diagnostic signal associated with the respective synchronization signal, the control unit is able to identify defects in the objects made and/or trace the causes of defects and/or critical situations in the line. That way, it is possible to apply corrective feedback on the individual object or on components of the line. For example, it is possible to detect a defect that would otherwise be difficult to detect on the finished object (as an internal defect would be) so as to be able to reject that object before it is delivered to a customer. It is also possible to correlate the defects of the objects with line malfunctions in order to carry out specific checks and maintenance operations. It is also possible to detect critical situations on the line in order to correct them before they give rise to defects in the products or line component failures.

In one embodiment, the synchronization signal represents the speed at which the doses and objects move along the line. In one embodiment, the first predetermined position is a stationary position relative to the movement of the ordered succession of doses and objects along the line.

Thus, in one embodiment, the synchronization signal is correlated with the feed speed of the products along the line. This embodiment allows using the sensor to take instantaneous measurements which represent a certain condition of the object at a given instant and tracing the history of the object which has given rise to that condition. In particular, associating a diagnostic signal with the synchronization signal representing the speed at which the doses and objects move along the line makes it possible to correlate a defect, diagnosed at a certain time instant, with the cause which produced that defect: for example, if a temperature sensor located downstream of the compression moulding machine detects that an object has come out of the machine at an anomalous temperature, it is possible, knowing the speed of the objects and of the doses along the line, to trace the mould in which that object was produced and thus the mould cooling system that is not functioning correctly.

In one embodiment, the synchronization signal represents an initial position of the line. The initial position may, for example, be detected by an encoder associated with the moulding carousel (in this case, the term "initial phase" may also be used. In effect, if the machine is always started from the same initial position, the speed of movement is the only information necessary to reconstruct the history of the products on the line; if the line is started from a variable initial position, on the other hand, the speed of movement must be correlated with information regarding the initial position.

In one embodiment, the synchronization signal represents the feed speed of the conveyor. In one embodiment, the synchronization signal represents the rotation speed of the extruder screw feeder.

In one embodiment, the synchronization signal is correlated with an angular position of the moulding carousel. More specifically, the synchronization signal is, in one embodiment, generated as a function of a signal detected by an encoder (angular position transducer). The encoder is preferably associated with the moulding carousel. In one embodiment, the encoder is associated with a carousel of the transfer apparatus (whose rotation is in any case correlated with the rotation of the moulding carousel).

In one embodiment, the synchronization signal correlated with the angular position of the moulding carousel in turn represents the speed of movement of the doses and objects along the line, through the angular speed of rotation of the moulding carousel (which is preferably constant). In another embodiment, the synchronization signal correlated with the angular position of the moulding carousel is independent of the angular speed of rotation of the moulding carousel (which might not be constant).

In one embodiment, the control unit is responsible for receiving an analogue signal representing a time trend of the first diagnostic signal. In one embodiment, the control unit is configured to generate a digital representation of the analogue signal. In one embodiment, the control unit is programmed to process the digital signal as a function of the synchronization signal. For example, the analogue signal might represent a pressure trend of a hydraulic circuit that drives the moulds. Storing the signal in digital form allows saving the trend in a database and/or easily analysing it.

In this embodiment, the sensor detects a diagnostic signal whose significance is not its instantaneous point value but its trend over a time period. The trend of certain signals over a time period may be useful to identify malfunctions in the machines or parts of them. The time period may be determined by the rotation cycle of the moulding carousel. That is the case where the sensor detects a signal relating to an operating parameter of the moulding carousel (for example, the pressure of a hydraulic circuit which drives the moulds). The time period may be determined by the rotation cycle of a carousel of the transfer apparatus. That is the case where the sensor detects a signal relating to an operating parameter of the carousel of the transfer apparatus (for example, the pressure of a pneumatic circuit which drives the pushers of the transfer apparatus).

In one embodiment, the control unit is programmed to capture the first diagnostic signal in a first succession of time instants. In one embodiment, the control unit is programmed to derive a corresponding first ordered succession of values of the first diagnostic signal. The first succession of time instants is a function of the synchronization signal and of the first predetermined position. Thus, for example, the temperature sensor located along the conveyor may be configured to detect the temperature continuously; the control unit captures the diagnostic temperature signal only at the time instants where an object passes the temperature sensor (not at the time instants where the uncovered stretch of the conveyor between one object and the next passes the temperature sensor). The time distance between one time instant at which the control unit detects the diagnostic signal relating to an object and the time instant at which the control unit detects the diagnostic signal relating to the next object is a function of the speed of movement of the objects from the compression moulding machine to the conveyor and of the feed speed of the objects along the conveyor: it is thus a function of the synchronization signal.

In one embodiment, the line comprises a second sensor. The second sensor is configured to detect a second diagnostic signal. The second sensor is disposed at a second predetermined position in the line. The second position is preferably different from the first position.

In one embodiment, the control unit is programmed to capture the second diagnostic signal in a second succession of time instants. In one embodiment, the second succession of time instants is different from the first succession of time instants. In one embodiment, the second succession of time instants coincides with the first succession of time instants. The second succession of time instants is a function of the synchronization signal and of the second predetermined position.

In one embodiment, the control unit is programmed to derive a corresponding second ordered succession of values of the second diagnostic signal.

In one embodiment, the control unit is programmed to correlate the first and second ordered successions of captured values, so that each value of the first ordered succession is correlated with a respective value of the second succession.

Preferably, the line comprises a plurality of sensors; what has been said for the first sensor and for the second sensor also applies, with the necessary changes made, to each sensor of the plurality.

Having a first and a second sensor (or a plurality of sensors), each of which is located at a respective position along the line and detects a respective diagnostic signal at a respective time instant, with the time instants being correlated with each other by the synchronization signal, allows cross-referencing different measurements performed on the same object (or on the dose used to make that object) to reconstruct the history of the object more precisely and to identify more precisely where the defects were formed and why.

In one embodiment, at each time instant of the first succession of time instants, the first sensor operatively interacts with a respective member of the ordered succession of doses or objects. In one embodiment, at one time instant of the second succession of time instants, the second sensor operatively interacts with same member of the ordered succession of doses or objects (with which the first sensor operatively interacted at a respective instant of the first succession). Thus, each time instant of the first succession corresponds to a time instant of the second succession. In effect, the same object passes in proximity to the first sensor at a first time instant and in proximity to the second sensor at a second time instant; these instants are correlated with each other and each instant of the first succession corresponds with an instant of the second succession.

In one embodiment, the first sensor is a temperature sensor configured to detect the temperature of the objects moulded by the compression moulding machine.

The temperature sensor for detecting the temperature of the moulded objects is configured to perform an instantaneous measurement. From the instantaneous measurement it is possible to reconstruct the history of the object using the synchronization signal representing the speed of movement of the doses and objects along the line.

In one embodiment, the first sensor is a pressure or flow sensor operatively connected in a pneumatic circuit responsible for driving the pushers of the transfer apparatus. The pushers act on respective doses of the ordered succession of doses.

In one embodiment, the pressure or flow sensor operatively connected in a pneumatic circuit responsible for driving the pushers of the transfer apparatus is configured to perform an instantaneous measurement. The measuring instant preferably follows a step of driving the pusher. From the instantaneous measurement it is possible to reconstruct the history of the object using the synchronization signal representing the speed of movement of the doses and objects along the line.

In one embodiment, the first sensor is a detection camera directed at the rotating carousel of the compression moulding machine to view each of the doses in a respective mould individually and in succession.

The detection camera is configured to capture an instantaneous image (snapshot). From this image, it is possible to reconstruct the history of the object using the synchronization signal representing the speed of movement of the doses and objects along the line.

In one embodiment, the first sensor is an inspection camera positioned along a path of movement of the objects moulded by the compression moulding machine to capture images of the individual objects.

The inspection camera is configured to capture an instantaneous image (snapshot). From this image, it is possible to reconstruct the history of the object using the synchronization signal representing the speed of movement of the doses and objects along the line.

In one embodiment, the first sensor is a flow meter operatively mounted in a duct responsible for supplying compressed air to a pneumatic system configured to extract the moulded objects from the respective moulds of the compression moulding machine.

The flow pressure meter is configured to detect a pressure trend in the supply duct of the pneumatic system during one turn of the moulding carousel. Analysing the pressure trend makes it possible to detect malfunctions in the pneumatic system for extracting the objects from the mould (for example, occlusion of the compressed air outlet holes or imprecise balance of the compressed air flow rate between the different moulds).

In one embodiment, the first sensor is a pressure transducer for each of the moulds of the compression moulding machine and operatively connected in a hydraulic circuit responsible for the relative movement of the mould parts which act in conjunction to produce compression.

The pressure transducer is configured to detect a pressure trend in the hydraulic circuit during one turn of the moulding carousel. Analysing the pressure trend of the hydraulic circuit makes it possible to detect malfunctions in the hydraulic circuit (for example, oil leaks between mould parts).

In one embodiment, the first sensor is an accelerometer (or vibration transducer) coupled to a pump for each of the moulds of the compression moulding machine and responsible for the relative movement of the mould parts which act in conjunction to produce compression.

The accelerometer is configured to detect a vibration trend during operation of the pump in one moulding cycle (from the moment the mould parts move towards each other to produce compression to the moment they move apart after producing the compression). Analysing the pump vibration trend (if necessary correlated with a pump delivery pressure trend) makes it possible to detect pump malfunctions (cavitation, for example).

In one embodiment, the first sensor is an optical sensor coupled to the extruder to detect a plasticization parameter, which indicates a physical state of the plastic material processed by the extruder.

The optical sensor may be configured to detect a trend of the plasticization parameter over time (in order to monitor that it is constant). The optical sensor may be configured to detect an instantaneous value of the plasticization parameter. In effect, the plasticization parameter may be detected in a succession of instants as a function of a rotation speed of the extruder screw feeder.

In one embodiment, the line comprises a plurality of optical sensors, each configured to detect a respective diagnostic signal and disposed at respective predetermined positions in the line. In one embodiment, the line comprises an apparatus of the type described in patent document WO2016181361A1, in the name of the present Applicant and incorporated herein by reference, for optical inspection of the polymeric material passing through the extruder. It is expressly understood that all the functional and structural features of the apparatus of patent document WO2016181361A1 can be applied to this embodiment of the system described herein.

In one embodiment, the first sensor is a speed sensor configured to measure an angular speed of an extruder screw and acting in conjunction with a pressure sensor located at an outfeed end of the extruder to measure the pressure of the plastic fluid flow.

The speed sensor may be configured to detect a screw speed trend over time (in order to monitor that it is constant). The speed sensor may be configured to detect an instantaneous value the screw speed. In effect, the screw speed may be detected in a succession of instants as a function of a rotation speed of the screw itself.

In one embodiment, the first sensor is a current or electrical power sensor configured to measure the electrical power (or electrical current) absorbed by the line or part of the line. In one embodiment, that part of the line is the extruder. In one embodiment, that part of the line is the transfer apparatus. In one embodiment, that part of the line is the compression moulding machine. In one embodiment, that part of the line is the conveyor.

The current or electrical power sensor may be configured to measure a trend of the electrical power absorbed by the line or part of the line. The current or electrical power sensor may be configured to measure an instantaneous value of the electrical power absorbed by the line or part of the line.

In one embodiment, the second sensor is selected from among the types of sensors described above with reference to the first sensor.

In one embodiment, the line comprises two or more sensors (or a plurality of sensors) selected from among the types of sensors described above with reference to the first sensor.

In one embodiment, the control unit is configured to store in a database the diagnostic signals captured by the sensors (in particular by the sensors configured to detect instantaneous signals). In one embodiment, the control unit is configured to process the diagnostic signals captured by the sensors as a function of the synchronization signal, in order to identify the causes of defects in the objects made.

According to one aspect of it, this disclosure relates to an extruder. According to one aspect of it, this disclosure relates to a transfer apparatus. According to one aspect of it, this disclosure relates to a compression moulding machine. According to one aspect of it, this disclosure relates to a conveyor.

According to one aspect of it, this disclosure relates to a method for the continuous cycle production of plastic objects.

The method comprises a step of extruding a solid plastic material. Extrusion produces a flow of plastic fluid.

The method comprises a step of forming an ordered succession of doses from that flow of plastic fluid. The steps of extruding and forming an ordered succession of doses are preferably carried out by an extruder.

The method comprises a step of placing the doses in corresponding moulds. The moulds are integral with (or placed on) a rotating moulding carousel. The step of placing is carried out by a transfer apparatus. In one embodiment, the transfer apparatus includes a transfer carousel.

The method comprises a step of moulding an ordered succession of objects. The step of moulding preferably includes compression moulding by compressing the doses in the moulds. Moulding is preferably carried out by the rotating moulding carousel and a plurality of moulds disposed in the moulding carousel.

The method comprises a step of transporting the objects away from the carousel one by one while keeping them in the same ordered succession. The step of moving the objects away is carried out preferably by a conveyor.

The method comprises a step of detecting a first diagnostic signal. The first diagnostic signal is detected by a first sensor disposed at a first predetermined position in the line.

The method comprises a step of generating a synchronization signal. The synchronization signal represents an operating configuration of the line in real time. The synchronization signal is generated by a control unit.

The method comprises a step of capturing the first diagnostic signal. The first diagnostic signal is captured (by the control unit) synchronously relative to the synchronization signal.

In one embodiment, the synchronization signal represents the speed at which the doses and objects move along the line. In one embodiment, the first predetermined position is a stationary position relative to the movement of the ordered succession of doses and objects along the line.

In one embodiment, the first diagnostic signal is captured in a first succession of time instants. In one embodiment, a first ordered succession of values of the first diagnostic signal, corresponding to the first succession of time instants, is derived (by the control unit). In one embodiment, the first succession of time instants is generated as a function of the synchronization signal and of the first predetermined position.

In one embodiment, the synchronization signal is correlated with an angular position of the rotating moulding carousel.

In one embodiment, the method comprises a step of digitizing an analogue signal representing a time trend of the first diagnostic signal. In one embodiment, the method comprises a step of processing the digital signal as a function of the synchronization signal.

In one embodiment, the first sensor is a temperature sensor which detects the temperature of the objects moulded by the compression moulding machine.

In one embodiment, the first sensor is a pressure or flow sensor connected in a pneumatic circuit which drives the pushers responsible for placing the doses in the moulds.

In one embodiment, the first sensor is a detection camera which views each of the doses in a respective mould individually and in succession.

In one embodiment, the first sensor is an inspection camera which captures images of the individual moulded objects.

In one embodiment, the first sensor is a flow pressure meter operatively mounted in a duct responsible for supplying compressed air to a pneumatic system which extracts the moulded objects from the respective moulds.

In one embodiment, the first sensor is a pressure transducer for each mould, operatively connected in a hydraulic circuit responsible for moving the mould parts which act in conjunction to produce compression.

In one embodiment, the first sensor is an accelerometer coupled to a pump for each of the moulds and responsible for producing the compression.

In one embodiment, the first sensor is an optical sensor which detects a plasticization parameter indicating a physical state of the plastic material processed during extrusion.

In one embodiment, the first sensor is a speed sensor which measures an angular speed of an extruder screw which performs extrusion, the speed sensor acting in conjunction with a pressure sensor which measures the pressure of the plastic fluid flow. Preferably, the pressure sensor measures the pressure of the plastic fluid feeding out of the extruder.

In one embodiment, the first sensor is a current or electrical power sensor which measures the electrical power absorbed during one of the steps of extruding the solid plastic material, forming an ordered succession of doses, placing the doses in corresponding moulds, compression moulding, conveying the objects away from the carousel (and, if necessary, also during the steps of detecting a first diagnostic signal, generating a synchronization signal and capturing the first diagnostic signal).

In one embodiment, the method comprises a step of detecting a second diagnostic signal. The second diagnostic signal is captured by a second sensor. The second sensor is disposed at a second position in the line. In one embodiment, the method comprises a step of capturing the second diagnostic signal. The second diagnostic signal is captured synchronously relative to the synchronization signal.

In one embodiment, the second diagnostic signal is captured in a second succession of time instants. In one embodiment, a second ordered succession of values of the second diagnostic signal, corresponding to the second succession of time instants, is derived (by the control unit). In one embodiment, the second succession of time instants is generated as a function of the synchronization signal and of the second predetermined position.

The second sensor is selected from among the types of sensors listed above for the first sensor.

BRIEF DESCRIPTION OF DRAWINGS

These and other features will become more apparent from the following detailed description of a preferred embodiment, illustrated by way of non-limiting example in the accompanying drawings, in which:

FIG. 2A schematically illustrates a compression moulding machine and a transfer apparatus of the line of FIG. 1;

FIG. 2B is a perspective view of the compression moulding machine of FIG. 2A;

DETAILED DESCRIPTION OF PREFERRED EMBODIMENTS OF THE INVENTION

Figure 1A:
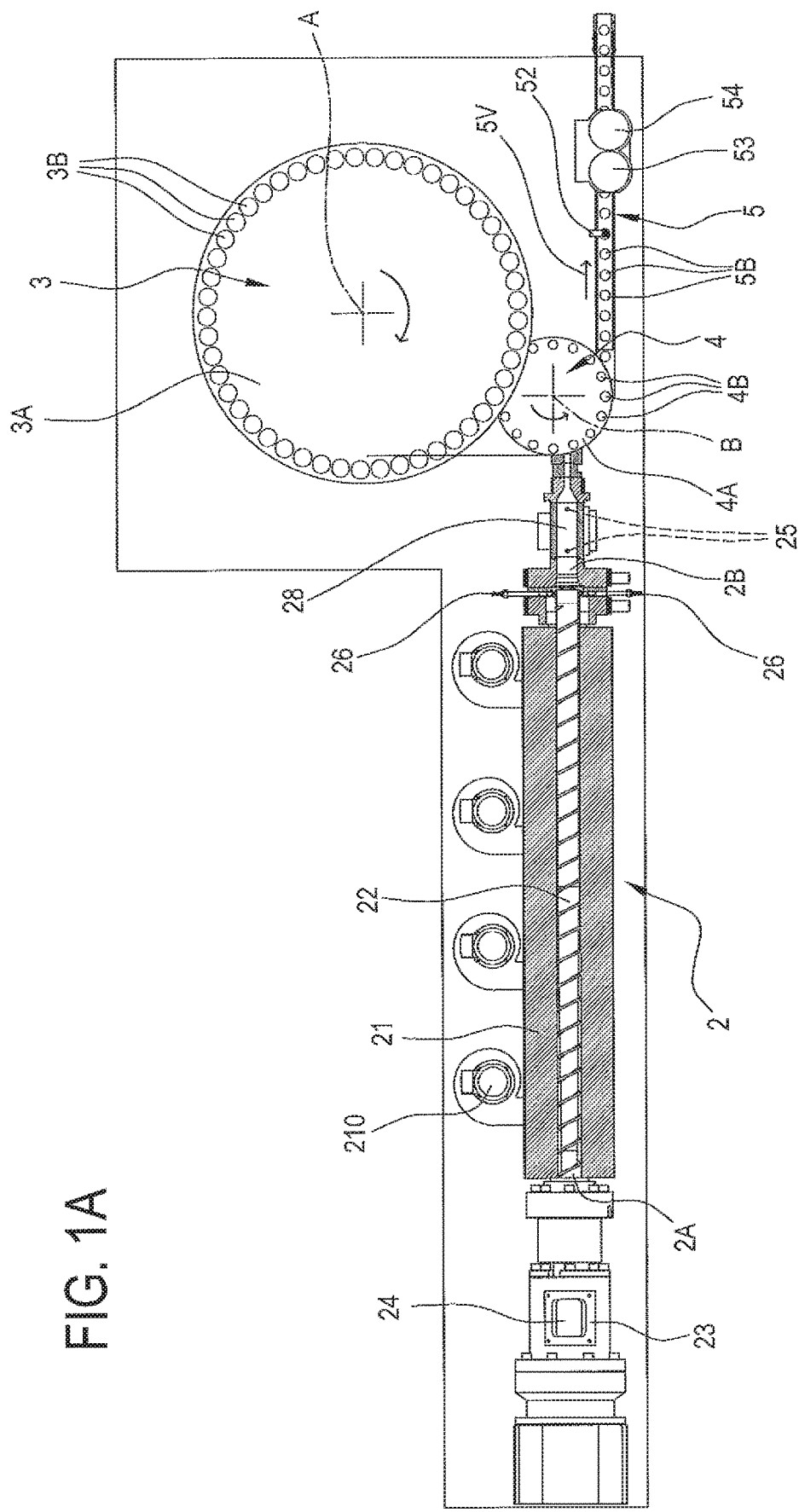
FIG. 1A illustrates line according to this disclosure in a cross section from above.
Figure 1B:
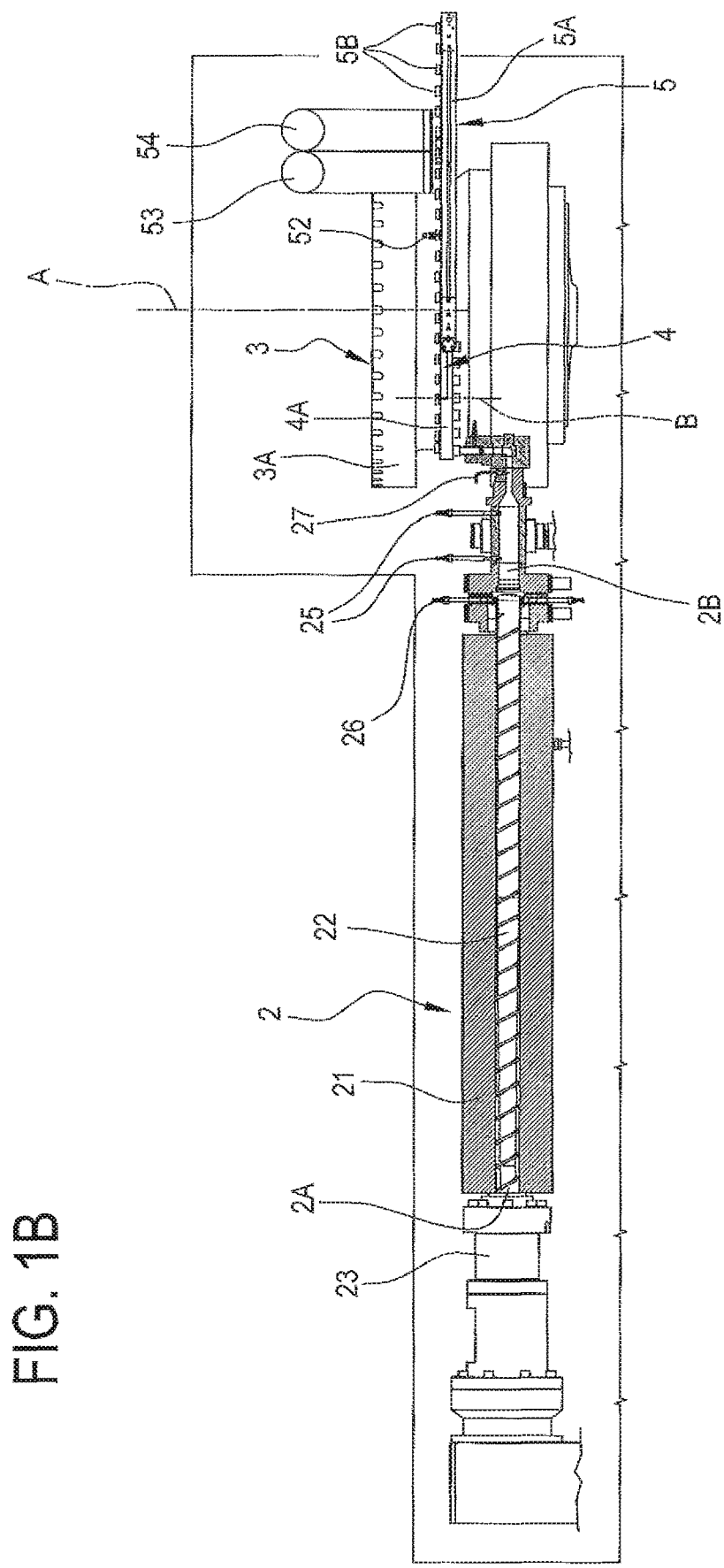
FIG. 1B illustrates the line of FIG. 1A in a side cross section.
Figure 3A:
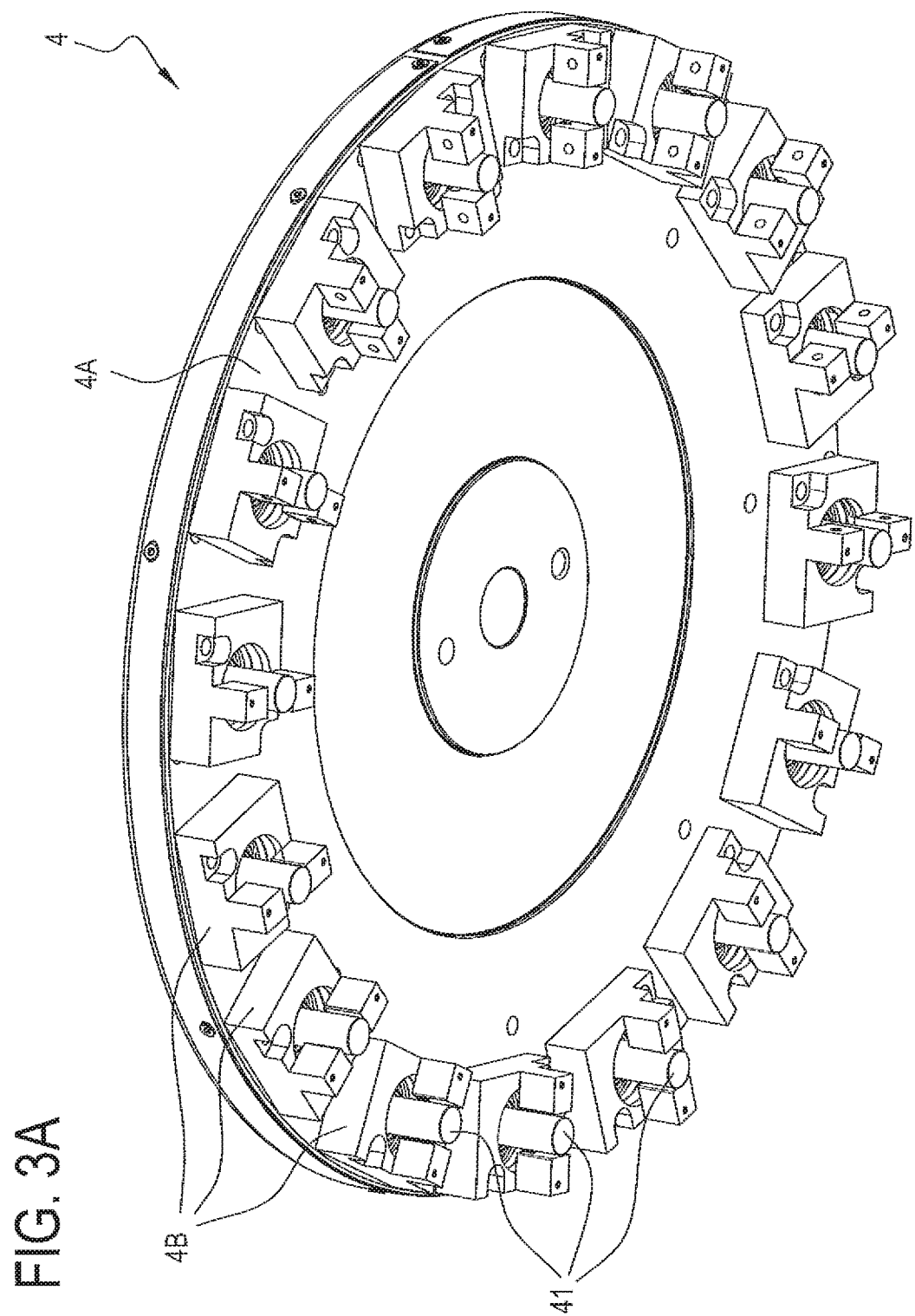
FIG. 3A is a perspective view of the transfer apparatus of the line of FIG. 1.

With reference to the accompanying drawings, the numeral 1 denotes a line for the continuous cycle production of plastic objects.

The line 1 comprises an extruder 2. In one embodiment, the extruder 2 is elongate in shape and extends between an infeed 2A (or infeed end) and an outfeed 2B (or outfeed end). The extruder 2 is configured to receive solid plastic material in raw form at the infeed end 2A. The extruder 2 is configured to feed out a flow of plastic fluid at the outfeed end 2B. The extruder 2 comprises an elongate screw feeder 22 extending between the infeed 2A and the outfeed 2B. The extruder 2 comprises a heating element 21 surrounding the screw feeder 22. The heating element 21 includes a plurality of electrical resistors. In one embodiment, the extruder 2 comprises one or more fans 210 connected to the heating element 21. The extruder 2 comprises a screw 23 configured to move (rotate) the screw feeder 22. In one embodiment, the screw 23 is driven by an electric motor. In one embodiment, the heating element 21 is switched on during start-up of the extruder 2, so as to bring the material to the fluid state. In one embodiment, the heating element 21 is switched off during steady-state operation of the extruder 2 and the material is fluidized only by the friction generated by the rotation of the screw feeder 22. In one embodiment, during steady-state operation of the extruder 2, the temperature of the fluid feeding out of the extruder 2 is monitored (by a thermocouple 27); if the temperature falls below a predetermined minimum threshold value, the heating element 21 is switched on; if the temperature rises above a predetermined maximum threshold value, the fans 210 are switched on. Thus, the fans 210 and the heating element 21 are configured to keep the extruder 2 in thermal balance.

By rotating, the screw feeder 22 causes the plastic material to advance from the infeed end 2A to the outfeed end 2B. As the plastic material advances from the infeed end 2A to the outfeed end 2B, its gradient of plasticization increases. Ideally, the plastic fluid at the outfeed end 2B is in a purely fluid state. In the event of extrusion problems (for example, if the material does not remain in contact with the heating element for a long enough time, or if the heating element does not provide sufficient heat) the fluid fed out may contain solid parts, known as "non-melts".

In one embodiment, the line 1 comprises an optical sensor 26. The optical sensor 26 is coupled to the extruder 2. The sensor 26 is configured to detect a plasticization parameter, which indicates a physical state of the plastic material processed by the extruder 2. The plasticization parameter thus indicates the possible presence of non-melts in the fluid material leaving the extruder 2.

In one embodiment, the control unit is programmed to generate an alarm signal as a function of the plasticization parameter (in particular, if the plasticization parameter exceeds a certain threshold value). In one embodiment, the control unit is programmed to shut down the machine as a function of the plasticization parameter (in particular, if the plasticization parameter exceeds a certain threshold value).

In one embodiment, the optical sensor 26 is a sensor of the type described in the scientific article "Near infrared (NIR) spectroscopy for in-line monitoring of polymer extrusion processes" (T. Rohe, W. Becker, S. Kölle, N. Eisenreich, P. Eyerer, Talanta 5, 1999, pages 283-290).

In one embodiment, the optical sensor 26 is located at the outfeed end 2B of the extruder 2. That way, the optical sensor 26 is responsible for detecting the plasticization parameter (by transmission).

The line may also comprise further optical sensors located along the screw feeder 22. The further optical sensors are responsible for detecting the plasticization parameter along the screw feeder 22 by reflection.

Ideally, the plastic fluid at the outfeed end 2B has constant pressure during operation of the extruder 2.

In one embodiment, the line 1 comprises a plastic fluid pressure sensor 25. The plastic fluid pressure sensor 25 is preferably located at the outfeed end 2B of the extruder 2. The plastic fluid pressure sensor 25 is configured to detect the pressure of the plastic fluid at the outfeed end 2B of the extruder 2. Any drop in the pressure of the plastic fluid at the outfeed end 2B of the extruder 2 indicates wear of the screw 23.

In one embodiment, the line 1 comprises a speed sensor 24. The speed sensor 24 is configured to measure the angular speed of the screw 23 of the extruder 2. The speed sensor 24 is preferably coupled to a reduction unit which connects the screw to an electric motor which drives the screw.

In one embodiment, the control unit is configured to vary the rotation speed of the electric motor which drives the screw 23. The speed is varied as a function of the pressure of the plastic fluid at the outfeed end 2B of the extruder 2, detected by the sensor 25, and of the angular speed of the screw 23, detected by the speed sensor 24. In one embodiment, the control unit is connected to a database containing a plurality of pressure values desirable for the outfeed end 2B of the extruder (these values may be a function, for example, of the type of plastic used and/or of the type of objects to be made); in the database, each desirable pressure value is associated with a respective rotation speed of the screw feeder 22 under ideal conditions where the screw feeder 22 is not worn. As the wear of the screw feeder 22 increases, the screw feeder 22 must be made to rotate at a higher speed to obtain the same desirable fluid pressure at the outfeed end 2B of the extruder 2. Thus, in one embodiment, the control unit is configured to increase the rotation speed of the screw feeder 22 as the pressure detected by the plastic fluid pressure sensor 25 decreases, thereby returning the pressure to the desirable value. In one embodiment, the database contains, for each desirable pressure value for the outfeed end 2B of the extruder 2, a maximum rotation speed of the screw feeder 22. In one embodiment, the control unit is therefore configured to shut down the line (and/or generate an alarm signal) as a function of the rotation speed of the screw feeder 22 detected by the speed sensor 24. In one embodiment, the control unit is therefore configured to shut down the line (and/or generate an alarm signal) when the rotation speed of the screw feeder 22 detected by the speed sensor 24 exceeds the maximum value.

In one embodiment, the line comprises a temperature sensor 27 (for example, a thermocouple) located at the outfeed end 2B of the extruder 2 and configured to measure the temperature of the fluid leaving the extruder 2. In effect, as the screw feeder 22 wears down, so the temperature of the fluid leaving the extruder 2 generally increases. In one embodiment, the database contains, for each desirable pressure value for the outfeed end 2B of the extruder 2 (and/or for each rotation speed value of the screw 23), a maximum temperature value of the fluid leaving the extruder 2. In one embodiment, the control unit is therefore configured to shut down the line (and/or generate an alarm signal) as a function of the rotation speed of the screw feeder 22 (or of the screw 23) detected by the speed sensor 24. In one embodiment, the control unit is therefore configured to shut down the line (and/or generate an alarm signal) when the rotation speed of the screw feeder 22 (or of the screw 23) detected by the speed sensor 24 exceeds the maximum value.

The line comprises a transfer apparatus 4. The transfer apparatus 4 is configured to obtain an ordered succession of doses from the flow of plastic fluid. In one embodiment, the line 1 comprises a cutting unit, configured to cut the plastic fluid feeding out of the extruder 2 so as to obtain the doses. In one embodiment, the line 1 comprises a dosing pump 28. In one embodiment, the cutting unit and the dosing pump 28 are stationary. In one embodiment, the dosing pump 28 is interposed between the outfeed end 2B of the extruder 2 and the transfer apparatus 4. In one embodiment, the cutting unit is built into the transfer apparatus 4.

The transfer apparatus 4 is configured to feed the doses individually to the compression moulding machine 3. In one embodiment, the transfer apparatus 4 comprises a transfer carousel 4A having a plurality of transfer seats 4B. The transfer carousel 4A is rotatable about a respective axis B.

The transfer carousel 4A is configured on an underside face of it to receive the doses in ordered succession (from the cutting unit). For each transfer seat 4B of the transfer carousel 4A, the transfer apparatus comprises a pusher 41. Thus, each pusher 41 acts on a respective dose. The pusher 41 is preferably driven by a pneumatic circuit. Each seat 4B of the plurality of seats of the transfer apparatus comprises an actuating chamber 42. The actuating chamber 42 is connected to a compressed air distributor 45. The compressed air distributor 45 rotates on the transfer carousel 4A. The compressed air distributor 45 is connected to a compressed air tank. When compressed air is delivered into the actuating chamber 42, the pusher 41 switches from an "off" position to an "on" position. In the "on" position, the pusher 41 causes the dose to be transferred from the transfer apparatus 4 to the compression moulding machine 3. In one embodiment, the actuating chamber 42 is located above the respective pusher 41 along a vertical direction (parallel to the weight force): thus, the pusher 41 is raised in the "off" position and lowered in the "on" position.

Each seat 4B of the plurality of seats of the transfer apparatus comprises a compression chamber 43. When the actuating chamber 42 is filled with compressed air, the movement of the pusher 41 from the "off" position to the "on" position produces compression in the compression chamber 43.

The transfer apparatus 4 comprises a manifold 46 of a low pressure circuit. The manifold 46 is connected to the compression chamber 43. The transfer apparatus 4 also comprises a throttle 47, connected to the manifold 46. Each compression chamber 43 is connected by the manifold 46 to the throttle 47. In one embodiment, all the compression chambers 43 are connected to one throttle 47 and to one manifold 46. The throttle 47 is open to the outside atmosphere.

The pushers 41 are driven (that is brought from the "off" position to the "on" position) one at a time when the respective seat 4B passes in proximity to a mould 3B. When a pusher 41 is driven, the effect of moving the pusher 41 combined with the presence of the throttle 47 creates an overpressure in the compression chamber 43, hence in the manifold 46.

Preferably, the distributor 45 is also configured to create a negative pressure (vacuum) in the actuating chamber 42 to bring the pusher 41 back from the "on" position to the "off" position (after transferring the dose to the mould 3B). In another embodiment, the transfer apparatus 4 comprises, for each pusher 41, a respective spring configured to bring the pusher 41 back from the "on" position to the "off" position (after transferring the dose to the mould 3B). In another embodiment, compressed air is pumped into the compression chamber 43 in order to bring the pusher 41 back from the "on" position to the "off" position (after transferring the dose to the mould 3B).

In one embodiment, the line 1 comprises a pressure sensor 48. The pressure sensor 48 is connected to the manifold 46. The pressure sensor 48 is responsible for measuring the pressure in the manifold 46. The pressure sensor 48 is preferably a pressure switch (simpler). In one embodiment, the pressure sensor 48 is a flow pressure meter (more complex). The pressure sensor 48 is preferably a single sensor connected to all the compression chambers 43.

The pressure sensor 48 is connected to the control unit. A pressure fault detected by the pressure sensor 48 indicates an air leak between the actuating chamber 42 and the compression chamber 43.

Preferably, when the pusher 41 is in the "on" position (and thus the actuating chamber 42 is full of air), a further jet of compressed air is pumped into the actuating chamber 42. Next, the air which leaks from the actuating chamber 42 to the compression chamber 43 is measured by means of the pressure sensor 48. In effect, air leakage from the actuating chamber may be due to wear of the pusher 41 or incorrect component size. Thanks to the additional jet of air pumped in when the piston is in the "on" position (before it returns to the "off" position), the pressure sensor 48 improves the precision of its measurement. Thus, the pressure sensor 48 may be a simple pressure switch.

Alternatively, the pressure might be measured using the pressure sensor 48 at the same time as the pusher 41 moves from the "off" position to the "on" position; in this case, the pressure sensor 48 is preferably a flow pressure meter.

In one embodiment, the control unit is configured to detect malfunctions in the transfer apparatus 4 as a function of the signals detected by the pressure sensor 48. The control unit detects any malfunctions in the transfer apparatus 4 as a function of the signals detected by the pressure sensor 48 during an initial testing stage to detect any minor difference in the dimensions of the components and/or assembly errors, during use and after maintenance. In one embodiment, the control unit is configured to plan line maintenance shutdowns as a function of the signals detected by the pressure sensor 48 (before the malfunctions reach a stage such as to cause defective products to be scrapped).

The line comprises a compression moulding machine 3. The compression moulding machine 3 includes a moulding carousel 3A. The moulding carousel 3A rotates about an axis of rotation A of the moulding carousel.

The compression moulding machine 3 includes a plurality of moulds 3B. By moulds is meant moulding cavities.

The moulding carousel 3A is configured to receive the doses from the transfer carousel 4A. In one embodiment, the moulding carousel 3A is provided with an annular groove in which the transfer carousel 4A passes in order to deposit the doses.

In one embodiment, the line 1 comprises a detection camera 31. The camera 31 is directed at the moulding carousel 3A. The camera 31 is stationary relative to the moulding carousel 3A, located at a point where the dose has already been released onto the mould 3B and the mould 3B has not yet closed. The camera 31 is configured to view individually and in succession each of the doses placed (by the transfer carousel 4A) in a respective mould 3B. The camera 31 is configured to detect any differences between the point of contact of the dose with the mould 3B and an optimum point of contact. The camera 31 is connected to the control unit. The control unit identifies any drift of the insertion position as a function of the (image) signals captured by the detection camera 31. The drift may be due to parts which are dirtied during operation. In one embodiment, the control unit plans machine cleaning shutdowns as a function of the (image) signals captured by the detection camera 31. As a function of the (image) signals captured by the detection camera 31, the control unit identifies which pusher 41 of the transfer apparatus 4 is drifting and/or which mould 4B is dirty. It is also possible, as a function of the (image) signals captured by the detection camera 31, to optimize the insertion setup during the initial testing stage or after maintenance in order to check for minor dimensional differences or assembly errors.

In one embodiment, each mould 3B comprises an upper mould part 32A and a lower mould part 32B. The upper and lower mould parts 32A and 32B are movable relative to each other between an open position where they are spaced apart in order to receive the dose and to discharge the moulded object, and a closed position where they are close together in order to shape the object from the does (by moulding). In one embodiment, the transfer carousel 4A places the dose on the lower mould part 32B while the mould parts 32A and 32B are in the open position. In one embodiment, the upper mould part 32A is the male part and the lower mould part 32B is the female part. In one embodiment, the lower part 32B moves towards the upper part 32A to pass from the (spaced-apart) open position to the (close-together) closed position. The parts might also be inverted. In one embodiment, the compression moulding machine 3 comprises a hydraulic circuit to move the lower part 32B towards the upper part 32A.

Figure 4B:
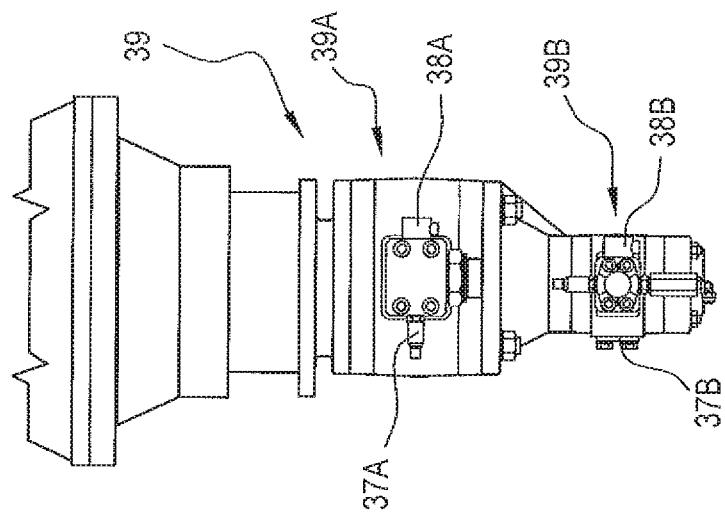
FIGS. 4A and 4B show respective details of the compression moulding machine of the line of FIG. 2B.
Figure 4A:
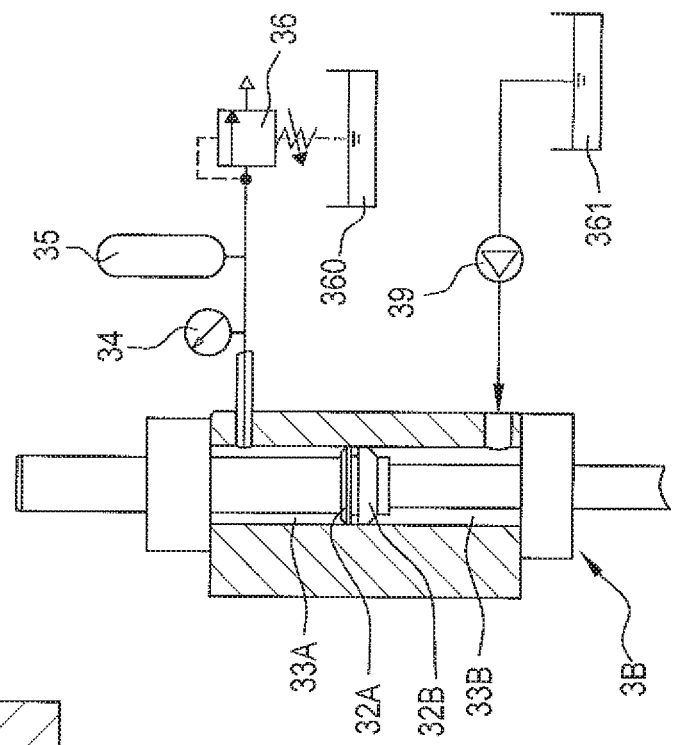
Figure 3B:
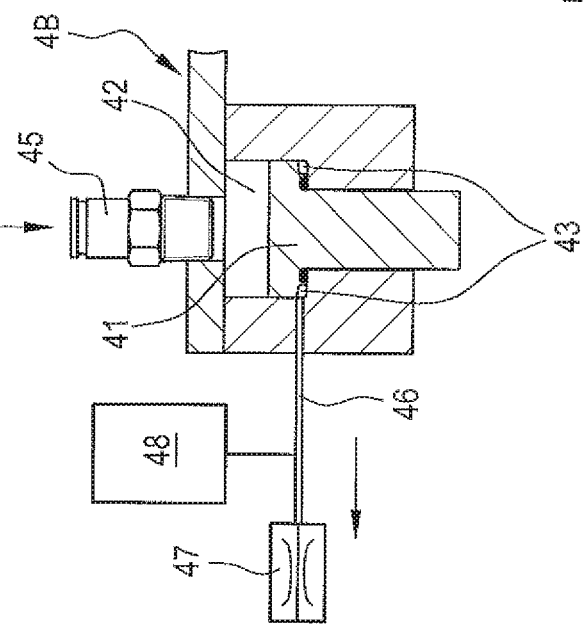
FIG. 3B shows a cross section of a detail of the transfer apparatus of FIG. 3A.
Figure 5:
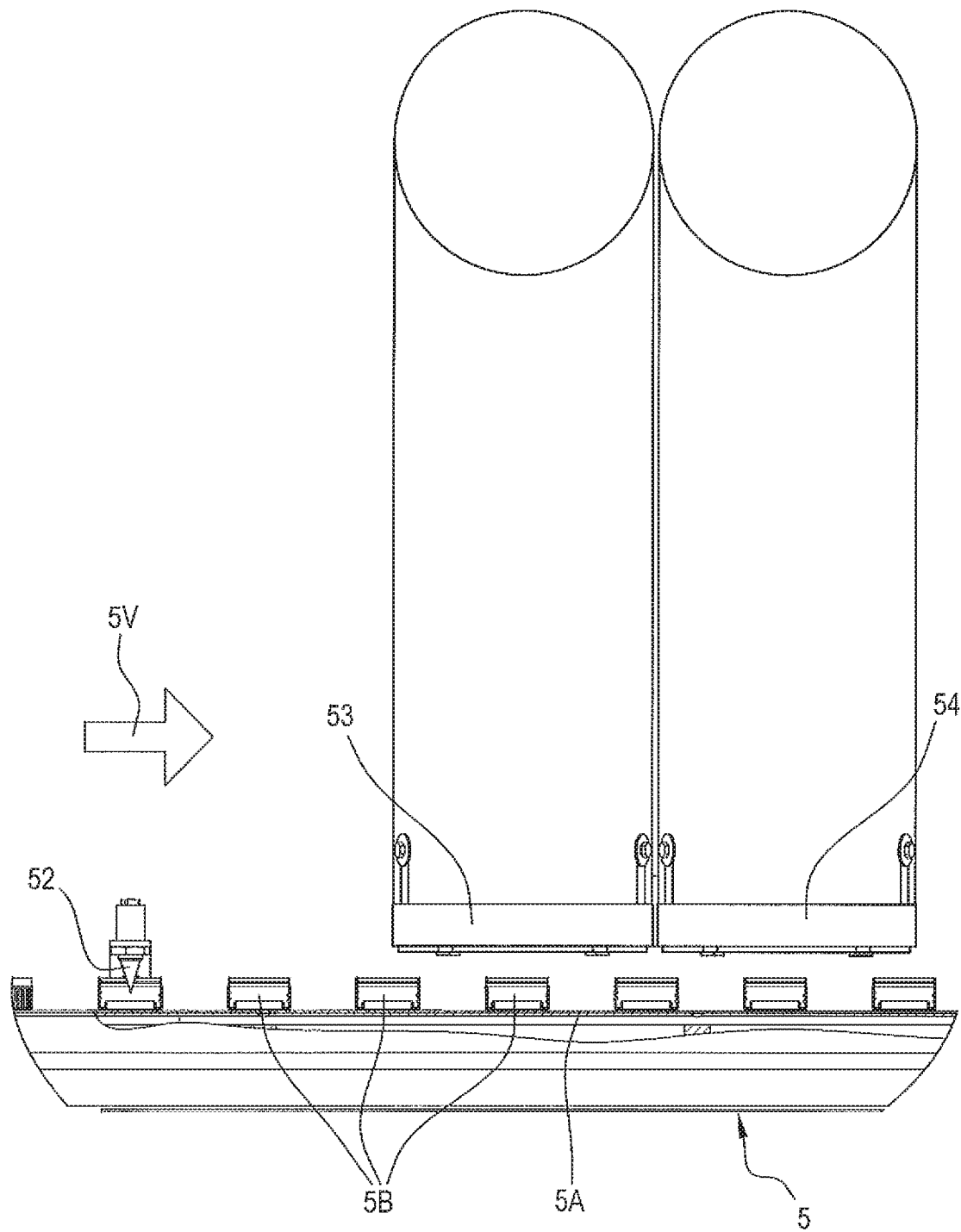
FIG. 5 shows a conveyor of the line of FIG. 1.
Figure 6:
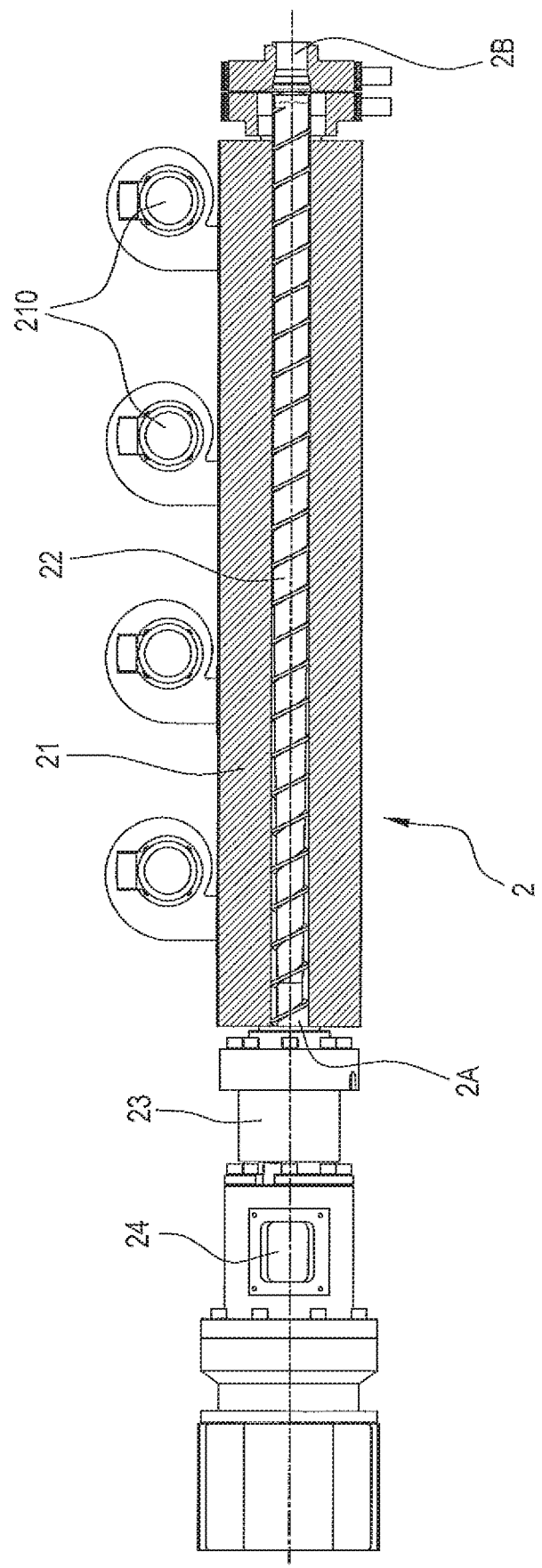
FIG. 6 shows an extruder of the line of FIG. 1.

FIG. 4A shows the hydraulic circuit during a step of raising the lower part 32B and thus closing the mould 3B.

The hydraulic circuit comprises an oil pump 39 configured to pump oil into a lower chamber 33B so as to actuate the lower part 32B of the mould 3B. In one embodiment, there is a main oil pump 39 connected to the lower chamber 33B of each mould 3B. The lower part 32B is thus moved towards and compressed against the upper part 32A in order to close the mould 3B. Compressing the lower part 32B against the upper part 32A has the effect of compressing the oil contained in an upper chamber 33A, in contact with the upper part 32A of the mould 3B.

In one embodiment, the hydraulic circuit comprises a pressure regulator 36. In one embodiment, the pressure regulator 36 is a regulating valve. In one embodiment, the pressure regulator 36 is a throttle.

In one embodiment, the hydraulic circuit comprises a tank 360. In one embodiment, the pressure regulator 36 is connected to the tank 360. The pressure regulator 36 feeds oil into the tank 360 at atmospheric pressure. In one embodiment, the hydraulic circuit comprises a buffer 35, connected to the circuit leg which connects the upper chamber 33A to the pressure regulator 36. The buffer 35 is preferably pressurized (that is, at a pressure higher than atmospheric pressure). In one embodiment, the pressure regulator 36 has the function of regulating the pressure in the buffer 35 (especially during transients).

In one embodiment, the hydraulic circuit comprises an additional tank 361. The additional tank 361 is at atmospheric pressure. The pump 39 is connected to the tank 360 to draw oil therefrom. In one embodiment, the additional tank 361 coincides with the tank 360. In another embodiment, the additional tank 361 and the tank 360 are two separate tanks.

The regulator 36 also has an output which, in one embodiment, is also connected to the tank 360. In another embodiment (called regenerative) the output of the pressure regulator 36 is connected to the delivery end of the pump 39 (that is, to the circuit leg which connects the delivery end of the pump 39 to the lower chamber 3B). In other embodiments, the output of the pressure regulator is connected to other components, not illustrated, of the hydraulic circuit.

In one embodiment, the line 1 comprises a pressure transducer 34. Preferably, there is a single pressure transducer 34 connected to all the moulds 3B. The pressure transducer 34 is operatively connected in the hydraulic circuit, between the pressure regulator 36 and the upper chamber 33A of each mould 3B. Preferably, the pressure transducer 34 is operatively connected in the hydraulic circuit, between the buffer 35 and the upper chamber 33A of each mould 3B. In one embodiment, the control unit is connected to the pressure transducer 34 to detect possible oil leaks between the lower chamber 33B of a mould 3B and the upper chamber 33A of that mould 3B. Such leaks may be due to wear of the lower mould parts 32B and upper mould parts 32A, or to dimensional differences of the components, or to seal wear between the lower mould 32B and the upper mould 32A.

In one embodiment, the oil pump 39 is connected to the lower chambers 33B of the moulds 3B is a double pump, that is, a pump comprising a first stage 39A and a second stage 39B. The first stage 39A is driven during a first step of moving the lower mould part 32B closer to the upper mould part 33A; during this step of moving the two parts together, the movement of the lower mould part 32B is rapid and for it the pump 39 requires high flow capacity and low power. The second stage 39B is driven during a step of compressing the lower mould part 32B against the upper part 32A. Thus, the second stage 39B is driven after the first stage 39A. During the step of compressing, the pump 39 requires low flow capacity but high power to achieve the compression needed. Thus, the first stage 39A has flow capacity and lower power, whilst the second stage 39B has low flow capacity and high power. The first stage 39A and the second stage 39B are driven alternatively to each other.

In one embodiment, the line 1 comprises a first accelerometer 38A coupled to the first stage 39A of the pump 39. In one embodiment, the line 1 comprises a second accelerometer 38B coupled to the second stage 39B of the pump 39. In one embodiment, the first accelerometer 38A and the second accelerometer 38B are, generically, vibration sensors.

In one embodiment, the line 1 comprises a first pressure transducer 37A, coupled to the first stage 39A of the pump 39, to measure the delivery pressure of the first stage 39A. In one embodiment, the line 1 comprises a second pressure transducer 37B, coupled to the second stage 39B of the pump 39, to measure the delivery pressure of the second stage 39B.

The control unit is, in one embodiment, connected to a database which correlates a respective vibration trend with each pressure trend of the first stage 39A and of the second stage 39B. By comparing the signals detected by the pressure transducers 37A and 37B with the signals detected by the respective accelerometers 38A, 38B, the control unit detects cavitation of the first stage 39A and of the second stage 39B of the pump 39, thereby making it possible to prevent catastrophic breakdowns.

In one embodiment, the compression moulding machine 3 comprises a compressed air circuit for extracting the moulded objects from the moulds 3B. The compressed air circuit is an open circuit, that is to say, it blows air into the moulds 3B and from there the air flows out into the atmosphere. Air is blown into the moulds 3B in succession: the flow needed for extraction is activated by the compressed air circuit in one corner of the moulding carousel. The compressed air circuit comprises a rotating manifold (or feed duct) which receives compressed air and distributes it to the moulds 3B by opening and closing specific valves. In one embodiment, the line 1 comprises a flow pressure meter 30 connected to the rotating manifold. The flow pressure meter 30 is responsible for detecting the pressure trend of the rotating manifold during one turn of the moulding carousel 3A. By analysing the pressure trend of the rotating manifold during one turn of the moulding carousel 3A (and comparing it with an ideal trend stored in the database), the control unit identifies the reduction, if any, of the efficiency of the compressed air circuit for extracting the objects from the moulds 3B. The reduced efficiency may be due to occluded ducts and vents of the circuit and the control unit can thus generate an alarm signal to indicate that cleaning is necessary. The reduced efficiency might also be due to incorrect balance of air flow in the different moulds 3B (in effect, the circuit is a parallel circuit and imbalances are possible). The control unit may analyse the signals detected by the flow pressure meter 30 during an initial testing stage, after maintenance or during production (monitoring).

In one embodiment, the transfer carousel 4A is configured to receive moulded (that is, shaped) objects 5B in succession from the moulding carousel 3A.

The line 1 comprises a conveyor 5. Preferably, the conveyor 5 includes a conveyor belt 5A. In one embodiment, the transfer carousel 4A is configured to release the moulded objects 5B onto the conveyor belt 5A. In one embodiment, the conveyor belt 5A is configured to receive the moulded (that is, shaped) objects 5B from the transfer carousel 4A. In one embodiment, the conveyor belt 5A is configured to hold the moulded (that is, shaped) objects 5B by suction. The conveyor belt 5A is configured to transport the moulded (that is, shaped) objects 5B away from the moulding carousel 3A. During transportation, the objects 5B are kept in the same ordered succession. The conveyor belt is configured to move the objects 5B in a feed direction 5V of the conveyor belt 5.

In one embodiment, the line comprises a temperature sensor 52 configured to detect the temperature of the objects 5B moulded by the compression moulding machine 3. The temperature sensor 52 is preferably disposed on the conveyor 5. The temperature sensor 52 is preferably located on the conveyor belt 5A, at a position proximal to the moulding carousel 3A (to detect the temperature of the objects when still hot). That way, a single temperature sensor 52 is configured to detect the temperature of all the moulded objects 5B. Preferably, the temperature sensor 52 is a pyrometer. Preferably, the temperature sensor 52 is a contactless sensor.

In other embodiments, the temperature sensor 52 might be located on the moulding carousel 3A itself: in such a case, there is a temperature sensor 52 in proximity to each mould 3B (and the temperature sensors 52 may be contact/immersion sensors). In yet other embodiments, the temperature sensor 52 might be disposed in a stationary part of the line 1 interacting with the conveyor 5 and with the compression moulding machine 3.

The temperature sensor 52 (or if there is a plurality of them, the temperature sensors 52) is connected (are connected) to the control unit. By comparing the temperature detected by the temperature sensor 52 with an optimum temperature, the control unit can recognize possible malfunctions in the cooling system of the moulds 3B. In effect, the cooling system of the moulds 3B includes parallel cooling channels. The control unit can therefore recognise (and, if necessary, correct) an occlusion in the cooling channels and/or imprecise balancing of the channels. Recognition of malfunctions in this way may be useful during an initial testing stage, after maintenance or during use (monitoring).

In one embodiment, the line 1 comprises an inspection camera 53. In one embodiment, the line 1 comprises an additional inspection camera 54. The inspection camera 53 is preferably located on the conveyor belt 5A to capture images of the moulded objects 5B. The additional inspection camera 54 is preferably located on the conveyor belt 5A to capture images of the moulded objects 5B. The control unit is connected to the inspection camera 53. The control unit is connected to the additional inspection camera 54. In one embodiment, there are a plurality of inspection cameras disposed on the conveyor belt 5A and connected to the control unit. By analysing the images captured by the inspection camera 53 (and by the additional inspection camera 54), the control unit recognises possible defects in the moulded objects 5B. In effect, the moulded objects 5B might have shape and/or dimensional defects on account of malfunctioning in the system which closes the moulds 3B and/or in the system which injects air in the moulds 3B. In one embodiment, the control unit is configured to compare the images captured by the inspection camera 53 (and by the additional inspection camera 54) with the data detected by the sensors disposed in the compression moulding machine 3 (for example, the pressure transducer 34 and the flow pressure meter 30) to identify the cause of the defects in the moulded objects 5B. By analysing the images captured by the inspection camera 53 (and by the additional inspection camera 54), the control unit recognises possible errors in the positioning of the moulded objects 5B on the belt 5A. By analysing the positioning errors, the control unit is able to detect wear or imprecise adjustments of the transfer apparatus 4 and of the conveyor 5.

The following paragraphs, listed in alphanumeric order for reference, are non-limiting example modes of describing this disclosure.

A. A line (1) for the continuous cycle production of plastic objects, comprising:
   an extruder (2) configured to receive solid plastic material in raw form and to feed out a flow of plastic fluid;
   a compression moulding machine (3) including a rotating moulding carousel (3A) and a plurality of moulds (3B) to form an ordered succession of objects from corresponding doses;
   a transfer apparatus (4) configured to obtain an ordered succession of doses from the flow of plastic fluid and to feed the doses individually to the compression moulding machine (3);
   a conveyor (5) configured to receive the objects individually and to transport them in the same ordered succession;
   a first sensor (24, 25, 26, 30, 31, 37, 38A, 38B, 48, 52, 53, 54) configured to detect a first diagnostic signal and located at a first predetermined position in the line (1);
   a control unit configured to generate a synchronization signal representing an operating configuration of the line (1) in real time and programmed to capture the first diagnostic signal synchronously relative to the synchronization signal.

A1. The line (1) according to paragraph A, wherein the synchronization signal represents the speed at which the doses and objects move along the line (1), and wherein the first predetermined position is a stationary position relative to the movement of the ordered succession of doses and objects along the line (1).

A1.1. The line (1) according to paragraph A1, wherein the control unit is programmed to capture the first diagnostic signal in a first succession of time instants, to derive a corresponding first ordered succession of values of the first diagnostic signal, wherein the first succession of time instants is a function of the synchronization signal and of the first predetermined position.

A1.1.1. The line (1) according to paragraph A1.1, comprising a second sensor (24, 25, 26, 30, 31, 37, 38A, 38B, 48, 52, 53, 54) configured to detect a second diagnostic signal and disposed at a second predetermined position in the line (1), different from the first position, wherein the control unit is programmed to capture the second diagnostic signal in a second succession of time instants, to derive a corresponding second ordered succession of values of the second diagnostic signal, wherein the second succession of time instants is a function of the synchronization signal and of the second predetermined position, and wherein the control unit is programmed to correlate the first and second ordered successions of captured values, so that each value of the first ordered succession is correlated with a respective value of the second succession.

A1.1.1.1. The line (1) according to paragraph A1.1.1.1, wherein at each time instant of the first succession of time instants, the first sensor (24, 25, 26, 30, 31, 37, 38A, 38B, 48, 52, 53, 54) operatively interacts with a respective member of the ordered succession of doses or objects, and wherein at any time instant of the second succession of time instants, the second sensor operatively interacts with the same member of the ordered succession of doses or objects.

A1.2. The line (1) according to any one of paragraphs A to A1.1.1.1, comprising a plurality of sensors (24, 25, 26, 30, 31, 37, 38A, 38B, 48, 52, 53, 54) configured to detect respective diagnostic signals and disposed at respective predetermined positions in the line (1), and wherein the control unit is programmed to capture the diagnostic signals generated by the sensors of the plurality of sensors, synchronously relative to the synchronization signal.

A1.2.1. The line (1) according to paragraph A1.2, wherein the control unit is programmed to capture each diagnostic signal in a respective succession of time instants, to derive a corresponding respective ordered succession of values of that diagnostic signal, wherein each succession of time instants is a function of the synchronization signal and of the predetermined position of the respective sensor.

A1.2.1.1. The line (1) according to paragraph A1.2.1, wherein the control unit is programmed to correlate the ordered successions of values captured by the sensors of the plurality, so that each value of each succession is correlated with a respective value of the other successions.

A1.2.1.1.1. The line (1) according to paragraph A1.2.1.1, wherein at each time instant of the respective succession of time instants, each sensor (24, 25, 26, 30, 31, 37, 38A, 38B, 48, 52, 53, 54) operatively interacts with a respective member of the ordered succession of doses or objects, and wherein at any time instant of the respective succession of time instants, another sensor operatively interacts with the same member of that ordered succession of doses or objects.

A2. The line (1) according to any one of paragraphs A to A1.2.1.1.1, wherein the synchronization signal is correlated with an angular position of the moulding carousel (3A).

A2.1. The line (1) according to paragraph A2, wherein the control unit is responsible for receiving an analogue signal representing a time trend of the first diagnostic signal, is configured to generate a digital representation of the analogue signal and is programmed to process the digital signal as a function of the synchronization signal.

A3. The line (1) according to any one of paragraphs A to A2.1, wherein the first sensor (24, 25, 26, 30, 31, 37, 38A, 38B, 48, 52, 53, 54) is a temperature sensor (52) configured to detect the temperature of the objects moulded by the compression moulding machine (3).

A3.1. The line (1) according to paragraph A3, wherein the temperature sensor (52) is configured to detect the temperature of the objects moulded by the compression moulding machine (3) while remaining at a predetermined distance from the objects.

A3.2. The line (1) according to paragraph A3 or paragraph A3.1, wherein the temperature sensor (52) is disposed on the conveyor (5).

A4. The line (1) according to any one of paragraphs A to A2.1, wherein the first sensor (24, 25, 26, 30, 31, 37, 38A, 38B, 48, 52, 53, 54) is a pressure or flow sensor (48) operatively connected in a pneumatic circuit responsible for driving the pushers (41) of the transfer apparatus (4), the pushers (41) acting on respective doses of the ordered succession of doses.

A4.1. The line (1) according to paragraph A4, wherein the pressure or flow sensor (48) is configured to detect an instantaneous value of the pressure in the pneumatic circuit.

A4.1.1. The line (1) according to paragraph A4.1, wherein the pressure or flow sensor (48) is programmed to detect the instantaneous pressure value at an instant in which the respective pusher (41) is at an "on" position, in contact with the dose, wherein the pneumatic circuit is configured to blow a first air jet to move the pusher to the "on" position, and then a second air jet at (or just before) the instant in which the pressure or flow sensor (48) is programmed to detect the instantaneous pressure value.

A4.2. The line (1) according to paragraph A4, or paragraph A4.1, wherein the pressure or flow sensor (48) is a pressure switch.

A5. The line (1) according to any one of paragraphs A to A2.1, wherein the first sensor (24, 25, 26, 30, 31, 37, 38A, 38B, 48, 52, 53, 54) is a detection camera (31) directed at the moulding carousel (3A) of the compression moulding machine (3) to view each of the doses in a respective mould (3B) individually and in succession.

A5.1. The line (1) according to paragraph 5, wherein the detection camera (31) is positioned along the moulding carousel (3A) on the outside thereof.

A5.2. The line (1) according to paragraph 5 or paragraph 5.1, wherein the detection camera (31) is configured to capture an instantaneous image of each of the doses inside a respective mould (3B).

A6. The line (1) according to any one of paragraphs A to A2.1, wherein the first sensor (24, 25, 26, 30, 31, 37, 38A, 38B, 48, 52, 53, 54) is an inspection camera (53) positioned along a path of movement of the objects moulded by the compression moulding machine (3) to capture images of the individual objects.

A6.1 The line (1) according to paragraph A6, wherein the inspection camera (53) is positioned on a belt (5A) of the conveyor (5).

A6.2. The line (1) according to paragraph A6 or paragraph A6.1, wherein the inspection camera (53) is configured to capture an instantaneous image of each object.

A7. The line (1) according to any one of paragraphs A to A2.1, wherein the first sensor (24, 25, 26, 30, 31, 37, 38A, 38B, 48, 52, 53, 54) is a flow pressure meter (30) operatively mounted in a duct responsible for supplying compressed air to a pneumatic system which extracts from the respective moulds (3B) the moulded objects formed in the compression moulding machine (3).

A7.1. The line (1) according to paragraph A7, wherein the flow pressure meter (30) is configured to detect a pressure trend during one turn of the moulding carousel (3A).

A7.2. The line (1) according to paragraph A7 or paragraph A7.1, wherein the flow pressure meter (30) is configured to detect a pressure trend in a rotating manifold configured to receive compressed air and to distribute it to the moulds (3B).

A8. The line (1) according to any one of paragraphs A to A2.1, wherein the first sensor (24, 25, 26, 30, 31, 37, 38A, 38B, 48, 52, 53, 54) is a pressure transducer (34) operatively connected in a hydraulic circuit responsible for the relative movement of the mould parts (32B, 32A) which, for each of the moulds (3B) of the compression moulding machine (3), act in conjunction to produce compression.

A8.1. The line (1) according to paragraph A8, wherein the pressure transducer (34) is configured to detect a pressure trend in the hydraulic circuit during one turn of the moulding carousel (3A).

A9. The line (1) according to any one of paragraphs A to A2.1, wherein the first sensor (24, 25, 26, 30, 31, 37, 38A, 38B, 48, 52, 53, 54) is an accelerometer (38A, 38B) coupled to a pump (39) responsible for the relative movement of the mould parts (32A, 32B) which, for each of the moulds (3B) of the compression moulding machine (3), act in conjunction to produce compression.

A9.1. The line (1) according to paragraph A9, wherein the accelerometer (38A, 38B) is configured to detect a trend of the vibrations in the pump (39) during one turn of the moulding carousel (3A).

A9.2. The line (1) according to paragraph A9 or A9.1, further comprising a pump delivery pressure transducer (37A, 37B) coupled to the pump (39).

A9.2.1. The line (1) according to paragraph A9.2, wherein the pump delivery pressure transducer (37A, 37B) is configured to detect a delivery pressure trend of the pump (37A, 37B) during one turn of the moulding carousel (3A).

A9.2.2. The line (1) according to paragraph A9.2 or paragraph A9.2.1, wherein the control unit is configured to process the diagnostic signal detected by the accelerometer (38A, 38B) as a function of the diagnostic signal detected by the pump delivery pressure transducer (37A, 37B).

A10. The line (1) according to any one of paragraphs A to A2.1, wherein the first sensor (24, 25, 26, 30, 31, 37, 38A, 38B, 48, 52, 53, 54) is an optical sensor (26) coupled to the extruder (2) to detect a plasticization parameter, which indicates a physical state of the plastic material processed by the extruder (2).

A11. The line (1) according to any one of paragraphs A to A2.1, wherein the first sensor (24, 25, 26, 30, 31, 37, 38A, 38B, 48, 52, 53, 54) is a speed sensor (24) configured to measure the angular speed of a screw (23) of the extruder (2), acting in conjunction with a plastic fluid pressure sensor (25) located at an outfeed end (2B) of the extruder (2) to measure the pressure of the plastic fluid flow.

A12. The line (1) according to any one of paragraphs A to A2.1, wherein the first sensor (24, 25, 26, 30, 31, 37, 38A, 38B, 48, 52, 53, 54) is a current or electrical power sensor configured to measure the electrical power absorbed by the line or part of the line.

B. A method for the continuous cycle production of plastic objects, comprising the following steps:
extruding a solid plastic material and generating a flow of plastic fluid;
forming an ordered succession of doses from that flow of plastic fluid;
inserting the doses in corresponding moulds (3B) integral with a rotating moulding carousel (3A);
compression moulding an ordered succession of objects by compressing the doses in the moulds (3B);
transporting the objects away from the moulding carousel (3A) one by one while keeping them in the same ordered succession;
detecting a first diagnostic signal through a first sensor (24, 25, 26, 30, 31, 37, 38A, 38B, 48, 52, 53, 54) located at a first predetermined position in the line (1);
generating a synchronization signal representing an operating configuration of the line (1) in real time;
capturing the first diagnostic signal synchronously relative to the synchronization signal.

B1. The method according to paragraph B, wherein the synchronization signal represents the speed at which the doses and objects move along the line (1), and wherein the first predetermined position is a stationary position relative to the movement of the ordered succession of doses and objects along the line (1).

B1.1. The method according to paragraph B1, wherein the first diagnostic signal is captured in a first succession of time instants, so as to derive a corresponding first ordered succession of values of the first diagnostic signal, wherein the first succession of time instants is generated as a function of the synchronization signal and of the first predetermined position.

B1.1.1. The method according to paragraph B1.1, comprising the following steps:
detecting a second diagnostic signal through a second sensor (24, 25, 26, 30, 31, 37, 38A, 38B, 48, 52, 53, 54) located at a second predetermined position in the line (1), different from the first position;
capturing the second diagnostic signal in a second succession of time instants, to derive a corresponding second ordered succession of values of the second diagnostic signal, wherein the second succession of time instants is a function of the synchronization signal and of the second predetermined position,
correlating first and second ordered successions of captured values, so that each value of the first ordered succession is correlated with a respective value of the second succession.

B1.1.1.1. The method according to paragraph B1.1.1, wherein at each time instant of the first succession of time instants, the first sensor (24, 25, 26, 30, 31, 37, 38A, 38B, 48, 52, 53, 54) operatively interacts with a respective member of the ordered succession of doses or objects, and wherein at any time instant of the second succession of time instants, the second sensor operatively interacts with the same member of that ordered succession of doses or objects.

B1.2. The method according to any one of paragraphs B1.1 to B1.1.1.1, comprising the following steps:
detecting a plurality of diagnostic signal through respective sensors (24, 25, 26, 30, 31, 37, 38A, 38B, 48, 52, 53, 54) located at a second predetermined position in the line (1), different from the first position;
capturing the diagnostic signals generated by the sensors of the plurality of sensors synchronously relative to the synchronization signal.

B1.2.1. The method according to paragraph B1.2, comprising the following steps:
capturing each diagnostic signal in a respective succession of time instants;
deriving a corresponding respective ordered succession of values of that diagnostic signal, wherein each succession of time instants is a function of the synchronization signal and of the predetermined position of the respective sensor.

B1.2.1.1. The method according to paragraph B1.2.1, comprising a step of correlating the ordered successions of values captured by the sensors of the plurality, so that each value of each succession is correlated with a respective value of the other successions.

B1.2.1.1.1. The method according to paragraph B1.2.1.1, wherein at each time instant of the respective succession of time instants, each sensor (24, 25, 26, 30, 31, 37, 38A, 38B, 48, 52, 53, 54) operatively interacts with a respective member of the ordered succession of doses or objects, and wherein at any time instant of the respective succession of time instants, another sensor operatively interacts with the same member of that ordered succession of doses or objects.

B2. The method according to any one of paragraphs B to B1.1.1.1, wherein the synchronization signal is correlated with an angular position of the rotating carousel (3A).

B2.1. The method according to paragraph B2, comprising a step of digitizing an analogue signal representing a time trend of the first diagnostic signal, the method further comprising a step of processing the digital signal as a function of the synchronization signal.

B3. The method according to any one of paragraphs B to B2. wherein the first sensor is according to any one of paragraphs A3 to A12.

B3.1. The method according to paragraph B4, wherein the first sensor (24, 25, 26, 30, 31, 37, 38A, 38B, 48, 52, 53, 54) is a pressure or flow sensor (48) operatively connected in a pneumatic circuit responsible for driving the pushers (41) of the transfer apparatus (4), the pushers (41) acting on respective doses of the ordered succession of doses.

B3.1.1. The method according to paragraph B3.1, wherein the pressure or flow sensor (48) detects an instantaneous value of the pressure in the pneumatic circuit.

B3.1.1.1. The method according to paragraph B3.1.1, wherein the pressure or flow sensor (48) detects the instantaneous pressure value at an instant in which the respective pusher (41) is at an "on" position, in contact with the dose, wherein the pneumatic circuit blows a first air jet to move the pusher to the "on" position, and then a second air jet at (or just before) the instant in which the pressure or flow sensor (48) detects the instantaneous pressure value.

C. An extruder (2) configured to receive solid plastic material in raw form and to feed out a flow of plastic fluid, comprising:
at least one sensor configured to detect a diagnostic signal and disposed at a predetermined position;
a control unit configured to receive the diagnostic signal and to capture a plurality of values thereof.

C1. The extruder (2) according to paragraph C, wherein the control unit is configured to process the diagnostic signals received from the at least one sensor and to generate a control signal.

C1.1. The extruder (2) according to paragraph C1, wherein the control signal includes a command to perform a feedback check based on a predetermined logic.

C1.2. The extruder (2) according to paragraph C1 or paragraph C1.1, wherein the control signal includes an alert.

C2. The extruder (2) according to any one of paragraphs C to C1.2, comprising an optical sensor (26) (being an example of the at least one sensor), configured to detect a plasticization parameter, which indicates a physical state of the plastic material processed by the extruder (2).

C3. The extruder (2) according to any one of paragraphs C to C2, comprising a speed sensor (24) (being an example of the at least one sensor), configured to measure the angular speed of a screw (23) of the extruder (2), acting in conjunction with a plastic fluid pressure sensor (25) located at an outfeed end (2B) of the extruder (2) to measure the pressure of the plastic fluid flow.

C3.1. The extruder (2) according to paragraph C3, wherein the control unit is programmed to vary the speed of the screw (23) with a feedback control as a function of the values of the angular speed detected by the speed sensor (24) and plastic fluid pressure detected by the pressure sensor (25).

C4. The extruder (2) according to any one of paragraphs C to C3.1, comprising a current or electrical power sensor (being an example of the at least one sensor), configured to measure the electrical power (or electrical current) absorbed by the extruder (2).

C5. The extruder (2) according to any one of paragraphs C to C4, comprising a thermocouple (27) (being an example of the at least one sensor), configured to detect a temperature of the fluid material at the outfeed end (2B) of the extruder (2).

C5.1. The extruder (2) according to paragraph C5, wherein the control unit is programmed to use feedback control to switch a heating element (21) on or off or to switch fans (210) on or off as a function of the temperature detected by the thermocouple (27).

D. A compression moulding machine (3), comprising:
a rotating moulding carousel (3A) and a plurality of moulds (3B) to form an ordered succession of objects from corresponding doses;
at least one sensor configured to detect a diagnostic signal and disposed at a predetermined position;
a control unit configured to receive the diagnostic signal and to capture a plurality of values thereof.

D1. The machine (3) according to paragraph D, wherein the control unit is configured to process the diagnostic signals received from the at least one sensor and to generate a control signal.

D1.1. The machine (3) according to paragraph D1, wherein the control signal includes a command to perform a feedback check based on a predetermined logic.

D1.2. The machine (3) according to paragraph D1 or paragraph D1.1, wherein the control signal includes an alert.

D2. The machine (3) according to any one of paragraphs D to D1.2, comprising a temperature sensor (52) (being an example of the at least one sensor), configured to detect the temperature of the objects moulded by the compression moulding machine (3).

D3. The machine (3) according to any one of paragraphs D to D2, comprising a detection camera (31) (being an example of the at least one sensor), directed at the rotating moulding carousel (3A) to view each of the doses in a respective mould (3B) individually and in succession.

D3.1. The machine (3) according to paragraph D3, wherein the detection camera (31) is configured to capture an instantaneous image of each of the doses inside a respective mould (3B).

D4. The machine (3) according to any one of paragraphs D to D3.1, comprising a flow pressure meter (30) (being an example of the at least one sensor), operatively mounted in a duct responsible for supplying compressed air to a pneumatic system which extracts from the respective moulds (3B) the moulded objects formed in the compression moulding machine (3).

D4.1. The machine (3) according to paragraph D4, wherein the flow pressure meter (30) is configured to detect a pressure trend during one turn of the moulding carousel (3A).

D4.2. The machine (3) according to paragraph D4 or paragraph D4.1 wherein the flow pressure meter (30) is configured to detect a pressure trend in a rotating manifold configured to receive compressed air and to distribute it to the moulds (3B).

D4.3. The machine (3) according to any one of paragraphs D4 to D4.2, wherein the control unit is driven by feedback as a function of the pressure trend detected by the flow pressure meter (30) to balance the compressed air flows directed at the moulds (3B).

D5. The machine (3) according to any one of paragraphs D to D4.1, comprising a pressure transducer (34) (being an example of the at least one sensor), operatively connected in a hydraulic circuit responsible for the relative movement of the mould parts (32B, 32A) which, for each of the moulds (3B) of the compression moulding machine (3), act in conjunction to produce compression.

D5.1. The machine (3) according to paragraph D5, wherein the pressure transducer (34) is configured to detect a pressure trend in the hydraulic circuit during one turn of the moulding carousel (3A).

D5.2. The machine (3) according to any one of paragraphs D5 to D5.1, wherein the control unit is driven by feedback as a function of the pressure trend detected by the pressure transducer (34) to modify the calibration of hydraulic circuit valves.

D6. The machine (3) according to any one of paragraphs D to D5.1, comprising an accelerometer (38A, 38B) (being an example of the at least one sensor), coupled to a pump (39) responsible for the relative movement of the mould parts (32A, 32B) which, for each of the moulds (3B) of the compression moulding machine (3), act in conjunction to produce compression.

D6.1. The machine (3) according to paragraph D6, wherein the accelerometer (38A, 38B) is configured to detect a trend of the vibrations in the pump (39) during one turn of the moulding carousel (3A).

D6.2. The machine according to paragraph D6 or D6.1, further comprising a pump delivery pressure transducer (37A, 37B) coupled to the pump (39).

D6.2.1. The machine (3) according to paragraph D6.2, wherein the pump delivery pressure transducer (37A, 37B) is configured to detect a delivery pressure trend of the pump (39A, 39B) during one turn of the moulding carousel (3A).

D6.2.2. The machine (3) according to paragraph D6.2 or paragraph D6.2.1, wherein the control unit is configured to process the diagnostic signal detected by the accelerometer (38A, 38B) as a function of the diagnostic signal detected by the pump delivery pressure transducer (37A, 37B).

D6.3. The machine (3) according to any one of paragraphs D6 to D6.2.2., wherein the control unit is configured to vary the speed of the pump (39) by feedback as a function of the vibration trend detected by the accelerometer (38A, 38B).

D7. The machine (3) according to any one of paragraphs D to D6.3, comprising a current or electrical power sensor (being an example of the at least one sensor), configured to measure the electrical power absorbed by the machine (3).

E. A transfer apparatus (4) configured to obtain an ordered succession of doses from the flow of plastic fluid and to feed the doses individually to the compression moulding machine (3), comprising:
at least one sensor configured to detect a diagnostic signal and disposed at a predetermined position;
a control unit configured to receive the diagnostic signal and to capture a plurality of values thereof.

E1. The apparatus (4) according to paragraph E, wherein the control unit is configured to process the diagnostic signals received from the at least one sensor and to generate a control signal.

E1.1. The apparatus (4) according to paragraph E1, wherein the control signal includes a command to perform a feedback check based on a predetermined logic.

E1.2. The apparatus (4) according to paragraph E1 or paragraph E1.1, wherein the control signal includes an alert.

E2. The apparatus (4) according to any one of paragraphs E to E1.2, comprising a pressure or flow sensor (48) (being an example of the at least one sensor), operatively connected in a pneumatic circuit responsible for driving the pushers (41) of the transfer apparatus (4), the pushers (41) acting on respective doses of the ordered succession of doses.

E2.1. The apparatus (4) according to paragraph E2, wherein the pressure or flow sensor (48) is configured to detect an instantaneous value of the pressure in the pneumatic circuit.

E2.1.1. The apparatus (4) according to paragraph E2.1, wherein the pressure or flow sensor (48) is programmed to detect the instantaneous pressure value at an instant in which the respective pusher is at an "on" position, in contact with the dose, wherein the pneumatic circuit is configured to blow a first air jet to move the pusher to the "on" position, and a second air jet at (or just before) the instant in which the pressure or flow sensor (48) is programmed to detect the instantaneous pressure value.

E2.2. The apparatus (4) according to paragraph E2, or paragraph E2.1, wherein the pressure or flow sensor (48) is a pressure switch.

E3. The apparatus (4) according to any one of paragraphs E to E2.2, comprising a current or electrical power sensor (being an example of the at least one sensor), configured to measure the electrical power (or electrical current) absorbed by the apparatus (4).

F. A conveyor (5) configured to individually receive objects moulded by a compression moulding machine (3) and to transport them in the same ordered succession, comprising.
at least one sensor configured to detect a diagnostic signal and disposed at a predetermined position;
a control unit configured to receive the diagnostic signal and to capture a plurality of values thereof.

F1. The conveyor (5) according to paragraph F, wherein the control unit is configured to process the diagnostic signals received from the at least one sensor and to generate a control signal.

F1.1. The conveyor (5) according to paragraph F1, wherein the control signal includes a command to perform a feedback check based on a predetermined logic.

F1.2. The conveyor (5) according to paragraph F1 or paragraph F1.1, wherein the control signal includes an alert.

F2. The conveyor (5) according to any one of paragraphs F to F1.2, comprising a temperature sensor (52) (being an example of the at least one sensor), configured to detect the temperature of the objects moulded by the compression moulding machine (3).

F2.1. The conveyor (5) according to paragraph F2, wherein the temperature sensor (52) is configured to detect the temperature of the objects moulded by the compression moulding machine (3) while remaining at a predetermined distance from the objects.

F.2.2. The conveyor (5) according to paragraph F2 or paragraph F2.1, wherein the temperature sensor (52) is disposed on the conveyor (5).

F3. The conveyor (5) according to any one of paragraphs F to F.2.2, comprising an inspection camera (53) (being an example of the at least one sensor), positioned along a belt (5A) of the conveyor (5) to capture images of the individual objects.

F3.1. The conveyor (5) according to paragraph F3, wherein the inspection camera (53) is configured to capture an instantaneous image of each object.

F4. The conveyor (5) according to any one of paragraphs F to F.3.1, comprising a current or electrical power sensor (being an example of the at least one sensor), configured to measure the electrical power (or electrical current) absorbed by the conveyor (5).

The invention claimed is:

1. A line for the continuous cycle production of plastic objects, comprising:
   an extruder configured to receive solid plastic material in raw form and to feed out a flow of plastic fluid;
   a compression moulding machine including a rotating moulding carousel and a plurality of moulds to form an ordered succession of objects from corresponding doses, wherein each mould includes mould parts movable relative to one another to produce compression of the doses, the compression moulding machine further including a hydraulic circuit responsible for the relative movement of the mould parts;
   a transfer apparatus configured to obtain an ordered succession of doses from the flow of plastic fluid and to feed the doses individually to the compression moulding machine;
   a conveyor configured to receive the objects individually and to transport them in the same ordered succession;
   a first sensor configured to detect a first diagnostic signal and located at a first predetermined position in the line; and
   a control unit configured to generate a synchronization signal representing an operating configuration of the line in real time and programmed to capture the first diagnostic signal synchronously relative to the synchronization signal;
   wherein the first predetermined position is disposed at the compression moulding machine;
   wherein the first sensor is a pressure transducer that senses a pressure parameter representative of an operation of the hydraulic circuit; and
   wherein, for the pressure parameter, a trend is derived with respect to the rotation of the moulding carousel.

2. The line according to claim 1, wherein the synchronization signal represents the speed at which the doses and objects move along the line, and wherein the first predetermined position is a stationary position relative to the movement of the ordered succession of doses and objects along the line.

3. The line according to claim 1, further comprising a second sensor selected from the following list:
   a) a temperature sensor configured to detect the temperature of the objects moulded by the compression moulding machine;
   b) a pressure or flow sensor operatively connected in a pneumatic circuit responsible for driving pushers of the transfer apparatus, the pushers acting on respective doses of the ordered succession of doses;
   c) a detection camera directed at the rotating moulding carousel of the compression moulding machine to view each of the doses in a respective mould individually and in succession;
   d) an inspection camera positioned along a path of movement of the objects moulded by the compression moulding machine to capture images of the individual objects;
   e) a flow pressure meter operatively mounted in a duct responsible for supplying compressed air to a pneumatic system configured to extract from the respective moulds the moulded objects formed in the compression moulding machine;
   a vibration transducer coupled to a pump for each of the moulds of the compression moulding machine and responsible for the relative movement of the mould parts which act in conjunction to produce compression;
   g) an accelerometer coupled to a pump responsible for the relative movement of the mould parts which, for each of the moulds of the compression moulding machine, act in conjunction to produce compression;
   h) an optical sensor coupled to the extruder for detecting a plasticization parameter, which indicates a physical state of the plastic material processed by the extruder;
   i) a speed sensor configured to measure the angular speed of a screw of the extruder, acting in conjunction with a plastic fluid pressure sensor located at an outfeed end of the extruder to measure the pressure of the plastic fluid flow;
   l) a current or electrical power sensor configured to measure the electrical power absorbed by the line or part of the line.

4. The line according to claim 2, wherein the synchronization signal is correlated with an angular position of the moulding carousel.

5. The line according to claim 4, wherein the control unit is responsible for receiving an analogue signal representing a time trend of the first diagnostic signal, is configured to generate a digital representation of the analogue signal and is programmed to process the digital signal as a function of the synchronization signal.

6. The line according to claim 2, wherein the control unit is programmed to capture the first diagnostic signal in a first succession of time instants, to derive a corresponding first ordered succession of values of the first diagnostic signal, wherein the first succession of time instants is a function of the synchronization signal and of the first predetermined position.

7. The line according to claim 6, comprising a second sensor configured to detect a second diagnostic signal and disposed at a second predetermined position in the line, different from the first position, wherein the control unit is programmed to capture the second diagnostic signal in a second succession of time instants, to derive a corresponding second ordered succession of values of the second diagnostic signal, wherein the second succession of time instants is a function of the synchronization signal and of the second predetermined position, and wherein the control unit is programmed to correlate the first and second ordered successions of captured values, so that each value of the first ordered succession is correlated with a respective value of the second succession.

8. The line according to claim 7, wherein at each time instant of the first succession of time instants, the first sensor operatively interacts with a respective member of the ordered succession of doses or objects, and wherein at any time instant of the second succession of time instants, the second sensor operatively interacts with the same member of the ordered succession of doses or objects.

9. The line according to claim 3 comprising two or more sensors selected from corresponding items of the list of claim 3.

10. A line for the continuous cycle production of plastic objects, comprising:
- an extruder configured to receive solid plastic material in raw form and to feed out a flow of plastic fluid;
- a compression moulding machine including a rotating moulding carousel and a plurality of moulds to form an ordered succession of objects from corresponding doses, wherein each mould includes mould parts movable relative to one another to produce compression of the doses, the compression moulding machine further including a hydraulic circuit responsible for the relative movement of the mould parts;
- a transfer apparatus configured to obtain an ordered succession of plastic quantities from the flow of plastic fluid and to feed the doses individually to the compression moulding machine;
- a conveyor configured to receive the objects individually and to transport them in the same ordered succession;
- a first sensor configured to detect a first diagnostic signal and located at a first predetermined position in the line; and
- a control unit configured to generate a synchronization signal representing an operating configuration of the line in real time and programmed to capture the first diagnostic signal synchronously with respect to the synchronization signal,
- wherein the control unit receives an analogue signal representing a time trend of the first diagnostic signal, generates a digital representation of the analogue signal, and processes the digital signal responsive to the synchronization signal,
- wherein the first sensor is a pressure transducer that senses a pressure parameter representative of an operation of the hydraulic circuit, and
- wherein, for the pressure parameter, a trend is derived with respect to the rotation of the moulding carousel.

11. The line according to claim 10, wherein the analogue signal represents a pressure trend of a hydraulic circuit that drives the moulds.

12. The line according to claim 10, wherein the control unit processes the first diagnostic signal based on a time trend of the first diagnostic signal over a time period.

13. The line according to claim 10, comprising a second sensor configured to detect a second diagnostic signal, the second sensor being located at a second predetermined position in the line, different from the first predetermined position, wherein the control processes the second diagnostic signal responsive to the synchronization signal and to the second predetermined position.

14. The line according to claim 12, wherein the time period is determined responsive to a rotation cycle of either (i) the moulding carousel or (ii) the transfer apparatus.

* * * * *